(12) United States Patent
Mikami

(10) Patent No.: US 10,071,931 B2
(45) Date of Patent: Sep. 11, 2018

(54) OPTICAL GLASS AND OPTICAL ELEMENT

(71) Applicant: HOYA CORPORATION, Tokyo (JP)

(72) Inventor: Shuhei Mikami, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 15/100,860

(22) PCT Filed: Dec. 2, 2014

(86) PCT No.: PCT/JP2014/081847
§ 371 (c)(1),
(2) Date: Jun. 1, 2016

(87) PCT Pub. No.: WO2015/093280
PCT Pub. Date: Jun. 25, 2015

(65) Prior Publication Data
US 2016/0304390 A1 Oct. 20, 2016

Related U.S. Application Data

(60) Provisional application No. 61/917,479, filed on Dec. 18, 2013.

(51) Int. Cl.
| | | |
|---|---|---|
| C03C 3/21 | (2006.01) | |
| C03C 4/02 | (2006.01) | |
| G02B 1/00 | (2006.01) | |
| G02B 3/00 | (2006.01) | |

(52) U.S. Cl.
CPC ............... C03C 3/21 (2013.01); C03C 4/02 (2013.01); G02B 1/00 (2013.01); G02B 3/00 (2013.01); C03C 2204/00 (2013.01)

(58) Field of Classification Search
CPC .... C03C 3/16; C03C 3/17; C03C 3/19; C03C 3/21
See application file for complete search history.

(56) References Cited

U.S. PATENT DOCUMENTS

| | | | | |
|---|---|---|---|---|
| 2002/0073735 A1* | 6/2002 | Hayashi | ............... | C03B 11/005 65/32.1 |
| 2004/0018933 A1 | 1/2004 | Ogino et al. | | |
| 2005/0113239 A1* | 5/2005 | Miyata | ............... | C03C 3/062 501/45 |
| 2005/0164862 A1 | 7/2005 | Shiraishi | | |
| 2007/0015651 A1* | 1/2007 | Endo | ............... | C03B 11/08 501/50 |
| 2009/0325774 A1 | 12/2009 | Ikenishi | | |
| 2012/0134027 A1* | 5/2012 | Zou | ............... | C03B 11/08 359/601 |
| 2012/0135199 A1* | 5/2012 | Satou | ............... | C03B 11/08 428/172 |
| 2013/0050827 A1 | 2/2013 | Li | | |
| 2013/0308041 A1 | 11/2013 | Hatada | | |
| 2016/0214881 A1* | 7/2016 | Mikami | ............... | C03C 3/064 |

FOREIGN PATENT DOCUMENTS

| | | |
|---|---|---|
| JP | 2002-201041 A | 7/2002 |
| JP | 2004-292301 A | 10/2004 |
| JP | 2008-013378 A | 1/2008 |
| JP | 2009-073674 A | 4/2009 |
| JP | 2011-042556 A | 3/2011 |
| JP | 2013-161076 A | 8/2013 |
| JP | 2013-174758 A | 9/2013 |

OTHER PUBLICATIONS

Mar. 5, 2015 Search Report issued in International Patent Application No. PCT/JP2014/081847.
Jun. 21, 2016 International Preliminary Report on Patentability issued in International Patent Application No. PCT/JP2014/081847.

* cited by examiner

*Primary Examiner* — Elizabeth A. Bolden
(74) *Attorney, Agent, or Firm* — Oliff PLC

(57) ABSTRACT

Optical glass that has an Abbe number (Vd) of less than 23 and is suitable for use as a single-lens material constituting a photographic-imaging lens; an optical element including the optical glass; and an imaging lens containing a lens including the optical glass. Optical glass that has an Abbe number (Vd) of less than 23, wherein a flat plate of said optical glass with a thickness of 10 mm exhibits an ISO color contribution index (ISO/CCI) of 0 for blue (B), up to 9 for green (G), and up to 9 for red (R).

29 Claims, 3 Drawing Sheets first lens group first lens group

OPTICAL GLASS AND OPTICAL ELEMENT

BACKGROUND OF THE INVENTION

1. Field of the Invention

The present invention relates to an optical glass, an optical element, and an imaging lens.

2. Description of Related Art

In a photographic-imaging lens, a single lens made of a high-dispersion glass with an Abbe number (vd) of about 24 is combined with a single lens made of a low-dispersion glass so as to correct chromatic aberration.

Example 1 of Patent Document 1 discloses a zoom lens having a convex meniscus lens at a $3^{rd}$ location from an object side towards an image side, the convex meniscus lens being made of a glass having an Abbe number (vd) of 23.78 and a refractive index (nd) of 1.84666 and being 3.5 mm in central thickness.

Numerical Example 2 of Patent Document 2 discloses an inner focus-type telescopic lens having a concave meniscus lens at a $4^{th}$ location from an image side towards an object side, the concave meniscus lens being made of a glass having an Abbe number (vd) of 23.78 and a refractive index (nd) of 1.84666 and being 1.0 mm in central thickness.

The first Example of Patent Document 3 discloses a zoom telescopic lens having a convex meniscus lens with a central thickness of 5.5 mm and a concave meniscus lens with a central thickness of 2.94 mm at $7^{th}$ and $11^{th}$ locations from an object side towards an image side, respectively, both the lenses being made of a glass having an Abbe number (vd) of 23.8 and a refractive index (nd) of 1.84666.

Numerical Example 2 of Patent Document 4 discloses a zoom telescopic lens having a lens at an $8^{th}$ location from an object side towards an image side, a location nearest to the image side in the state of being inserted into a magnification-conversion optical system, and the like, the lens being made of a glass having an Abbe number (vd) of 23.9 and a refractive index (nd) of 1.84666 and being in the range of 1.90 to 3.79 mm in central thickness.

In order to further enhance the function of such an imaging optical system or make the imaging optical system more compact, it is effective to further reduce the Abbe number of the high-dispersion lens or to increase the refractive index thereof.

Moreover, Patent Document 5 discloses an optical glass that is higher in dispersion than the glasses constituting the high-dispersion lenses disclosed in Patent Documents 1 to 4.

CITATION LIST

Patent Document (Patent Document 1) Japanese Patent Laid-Open Publication No. 2013-044964
(Patent Document 2) Japanese Patent Laid-Open Publication No. 2013-161076
(Patent Document 3) Japanese Patent Laid-Open Publication No. 2013-174758
(Patent Document 4) Japanese Patent Laid-Open Publication No. 2013-238827
(Patent Document 5) Japanese Patent Laid-Open Publication No. 2005-206433

SUMMARY OF THE INVENTION

Technical Problem

The high-dispersion glass disclosed in Patent Document 5 contains Ti, Nb, Bi, and W, as glass components, so as to increase dispersion. In order to adjust properties of the glass such that the Abbe number (vd) is less than 23, it is necessary to increase a total content of Ti, Nb, Bi, and W.

Ti, Nb, Bi, and W are likely to be reduced in a process of melting glass. If these components are reduced, the glass has absorption in a visible region. Hence, a glass that is high in total content of Ti, Nb, Bi, and W has a problem that transmittance of the visible region, particularly transmittance of a wavelength range corresponding to blue is lowered.

Meanwhile, a recommended range of color characteristics of the photographic-imaging lens as disclosed in Patent Documents 1 to 4 is established by ISO color contribution index (ISO/CCI) [Method of displaying color characteristics of photographic-imaging lens according to JIS Optical ISO color contribution index (ISO/CCI) B7097-1986 ] (hereinafter, referred to as "CCI standard").

Specifically, a color contribution index provided on the sides and interior of a hexagon formed by sequentially connecting respective points of triangular coordinates 0/0/0, 1/1/0, 1/3/0, 0/9/6, 0/9/9, 0/7/9, 0/0/2, and 0/0/0 established by the CCI standard, namely, the sides and interior of the hexagon shown by broken lines of FIG. 1 is recommended as color characteristics of the photographic-imaging lens.

Since the central thickness of the high-dispersion lens described in Patent Documents 1 to 4 ranges from about 1 to 5 mm, it is to be expected that the thickness of the high-dispersion lens is generally 5 mm or less.

For the glass with the Abbe number (vd) of 17.9, described as Example 3 of Patent Document 5, the color contribution index of the glass having the thickness of 5 mm is calculated as follows: ISO/CCI(B) is 0, ISO/CCI(G) is 11.6, and ISO/CCI(R) is 12.1.

Since this color contribution index is out of a recommended permissible range that is already established by the CCI standard for one single lens, this glass is unsuitable for use as a material of the single lens constituting the photographic-imaging lens.

In addition, a material of a high-dispersion lens mounted on the imaging lens described in Patent Documents 1 to 4, that is, a glass having the Abbe number (vd) of 23.78 and the refractive index (nd) of 1.84666 has the same optical characteristics as the glass material FDS90 manufactured by HOYA. For the glass material FDS90 manufactured by HOYA, the color contribution index of the glass material having the thickness of 10 mm that is greater than a central thickness of a lens that is being actually used is calculated as follows: ISO/CCI(B) is 0, ISO/CCI(G) is 2, and ISO/CCI (R) is 2, so that the color contribution index is within the recommended permissible range established by the CCI standard.

As such, if the Abbe number (vd) of an optical glass used as the lens material is set to be less than 23, the color contribution index for green and red is dramatically increased. Therefore, it is not easy to provide an imaging lens that satisfies the recommended permissible range established by the CCI standard while rendering the lens made of the high-dispersion glass to be more highly dispersed.

An object of the present invention is to provide an optical glass that has an Abbe number (vd) of less than 23 and is suitable for use as a single-lens material constituting a photographic-imaging lens, an optical element made of the optical glass, and an imaging lens having a lens made of the optical glass.

Solution to Problem

The color contribution index is an index, in the CCI standard, that describes a degree to which a color of a color photograph taken using a lens is expected to change by using the lens, relative to a color of a color photograph taken without the lens in a photographic-imaging system, and is represented by one set of three numerical values that are determined by three colors, namely, blue, green, and red.

At a wavelength (λ), a relative spectral transmittance aggregating spectral transmittances of all lenses constituting a photographic-imaging lens is defined as τ(λ).

Spectral sensitivities of a blue-sensitive layer, a green-sensitive layer, and a red-sensitive layer, which are determined such that photographic responses of a photosensitive layer (blue-sensitive layer) mainly sensing blue light, a photosensitive layer (green-sensitive layer) mainly sensing green light, and a photosensitive layer (red-sensitive layer) mainly sensing red light become equal respectively in the calculation of the ISO color contribution index (ISO/CCI), are referred to as weighted spectral sensitivities, the photosensitive layers constituting a color film for photography daylight. The weighted spectral sensitivities of the blue-sensitive layer, the green-sensitive layer and the red-sensitive layer are denoted by $W_B(\lambda)$, $W_G(\lambda)$, and $W_R(\lambda)$, respectively.

Next, $R_B$, $R_G$, and $R_R$ are defined by the follow Equations (1) to (3).

$$R_B = \Sigma(W_B(\lambda) \times \tau(\lambda)) \quad (1)$$

$$R_G = \Sigma(W_G(\lambda) \times \tau(\lambda)) \quad (2)$$

$$R_R = \Sigma(W_R(\lambda) \times \tau(\lambda)) \quad (3)$$

Here, $W_B(\lambda) \times \tau(\lambda)$ means a value obtained by multiplying the weighted spectral sensitivity of the blue-sensitive layer and the relative spectral transmittance, for the wavelength (λ) that ranges from 370 nm to 510 nm at intervals of 10 nm. $\Sigma(W_B(\lambda) \times \tau(\lambda))$ means the sum of $W_B(\lambda) \times \tau(\lambda)$ for the respective wavelength (λ) that is in the wavelength range from 370 nm to 510 nm at intervals of 10 nm.

$W_G(\lambda) \times \tau(\lambda)$ means a value obtained by multiplying the weighted spectral sensitivity of the green-sensitive layer and the relative spectral transmittance, for the wavelength (λ) that ranges from 470 nm to 600 nm at intervals of 10 nm. $\Sigma(W_G(\lambda) \times \tau(\lambda))$ means the sum of $W_G(\lambda) \times \tau(\lambda)$ for the respective wavelength (λ) that is in the wavelength range from 470 nm to 600 nm at intervals of 10 nm.

$W_R(\lambda) \times \tau(\lambda)$ means a value obtained by multiplying the weighted spectral sensitivity of the red-sensitive layer and the relative spectral transmittance, for the wavelength (λ) that ranges from 550 nm to 680 nm at intervals of 10 nm. $\Sigma(W_R(\lambda) \times \tau(\lambda))$ means the sum of $W_R(\lambda) \times \tau(\lambda)$ for the respective wavelength (λ) that is in the wavelength range from 550 nm to 680 nm at intervals of 10 nm.

A minimum value of $\log_{10} R_B$ that is a common logarithm of $R_B$, $\log_{10} R_G$ that is a common logarithm of $R_G$, and $\log_{10} R_R$ that is a common logarithm of $R_R$ is defined as $(\log_{10} R_i)_{min}$.

The color contribution index ISO/CCI(B) for blue, the color contribution index ISO/CCI(G) for green, and the color contribution index ISO/CCI(R) for red are represented, respectively, by the following Equations (4) to (6).

$$ISO/CCI(B) = [\log_{10} R_B - (\log_{10} R_i)_{min}] \times 100 \quad (4)$$

$$ISO/CCI(G) = [\log_{10} R_G - (\log_{10} R_i)_{min}] \times 100 \quad (5)$$

$$ISO/CCI(R) = [\log_{10} R_R - (\log_{10} R_i)_{min}] \times 100 \quad (6)$$

Hereinafter, in order to clearly distinguish between the photographic-imaging lens and the single lens constituting the photographic-imaging lens, the photographic-imaging lens will be referred to as an imaging optical system and the single-lens will be referred to as a lens.

Examples of the imaging optical system may include an interchangeable lens mounted on a body of a single-lens reflex camera, an interchangeable lens mounted on a body of a mirrorless single-lens reflex camera, an imaging optical system of a video camera and the like. A barrel holding the imaging optical system and the imaging optical system installed in the barrel are collectively referred to as an imaging lens.

In an optical glass used for an optical element constituting the imaging optical system, absorption is rarely observed at a region (visible region) that is longer in wavelength than an absorption edge extending from an ultraviolet region to the visible region. That is, the transmittances in green and red are higher than the transmittance in blue.

Therefore, the following Equation is satisfied: $(\log_{10} R_i)_{min} = \log_{10} R_B$, and consequently ISO/CCI(B) becomes equal to 0 from Equation (4).

The higher the transmittance for blue is, the larger the value of $\log_{10} R_B$, namely, $(\log_{10} R_i)_{min}$ becomes. Consequently, both the values of ISO/CCI(G) and ISO/CCI(R) become smaller, so that it is easy to have the color contribution index of the imaging optical system lie within the recommended permissible range established by the CCI standard.

Among lenses constituting the imaging optical system, a lens having the lowest transmittance for blue is the high-dispersion lens. As compared to transmittances of other conventional lenses, the transmittance of the high-dispersion lens for blue was lower. Hence, the transmittance of the glass constituting the high-dispersion lens for blue prevailingly serves as a factor for determining the ISO/CCI of the imaging optical system.

The central thickness of the high-dispersion lens is generally 5 mm or less. However, in the case of evaluating the ISO/CCI, according to the present exemplary embodiment, the ISO/CCI of the high-dispersion glass is evaluated with a flat plate having the thickness of 10 mm that is twice as thick as the maximum central thickness of the lens.

If the ISO/CCI of the high-dispersion glass with the thickness of 10 mm falls within the recommended permissible range of the CCI standard, when the glass is actually used as a lens, the thickness of the lens becomes equal to or less than about half of 10 mm. Such a reduction in thickness leads to a high transmittance. If the ISO/CCI of a glass that is thicker in the thickness than an actually used lens falls within the recommended permissible range, it is believed that the ISO/CCI of the overall imaging optical system falls sufficiently within the recommended permissible range, even in consideration of the effects of lenses other than the high-dispersion lens.

Therefore, the ISO/CCI of the optical glass having the Abbe number (vd) of less than 23 is evaluated with the glass having the thickness of 10 mm.

In addition, even when the transmittance of the optical glass is evaluated, it is often evaluated by the spectral transmittance of the glass having the thickness of 10 mm. It is technically suitable to evaluate the ISO/CCI of the glass with the thickness of 10 mm.

Maximum values of both ISO/CCI(G) and ISO/CCI(R) in the recommended permissible range established by the CCI standard are 9. As described above, ISO/CCI(B) is zero.

Therefore, the optical glass that has the Abbe number (vd) of less than 23, and exhibits ISO/CCI(B) of 0, ISO/CCI(G) of 9 or less, and ISO/CCI(R) of 9 or less in the thickness of 10 mm may provide the glass material that is suitable for use as the high-dispersion material for the optical element constituting the imaging optical system.

The present invention has been made from such findings.

That is, a first exemplary embodiment of the present invention provides an optical glass which has an Abbe number (vd) of less than 23, wherein an ISO color contribution index (ISO/CCI) in terms of a flat plate with a thickness of 10 mm is 0 for blue (B), 9 or less for green (G), and 9 or less for red (R).

A second exemplary embodiment of the present invention provides an optical element comprising the optical glass described in the first exemplary embodiment.

A third exemplary embodiment of the present invention provides an imaging lens having a barrel and a plurality of single lenses arranged in the barrel, wherein at least one of the plurality of single lenses may include the above-described optical glass.

Effect of the Invention

The present invention may provide an optical glass that has an Abbe number (vd) of less than 23 and is suitable for use as a single-lens material constituting a photographic-imaging lens, and an optical element made of the optical glass. Further, the present invention may provide an imaging lens having a lens made of the optical glass.

DETAILED DESCRIPTION OF EXEMPLARY EMBODIMENTS

Figure 1:
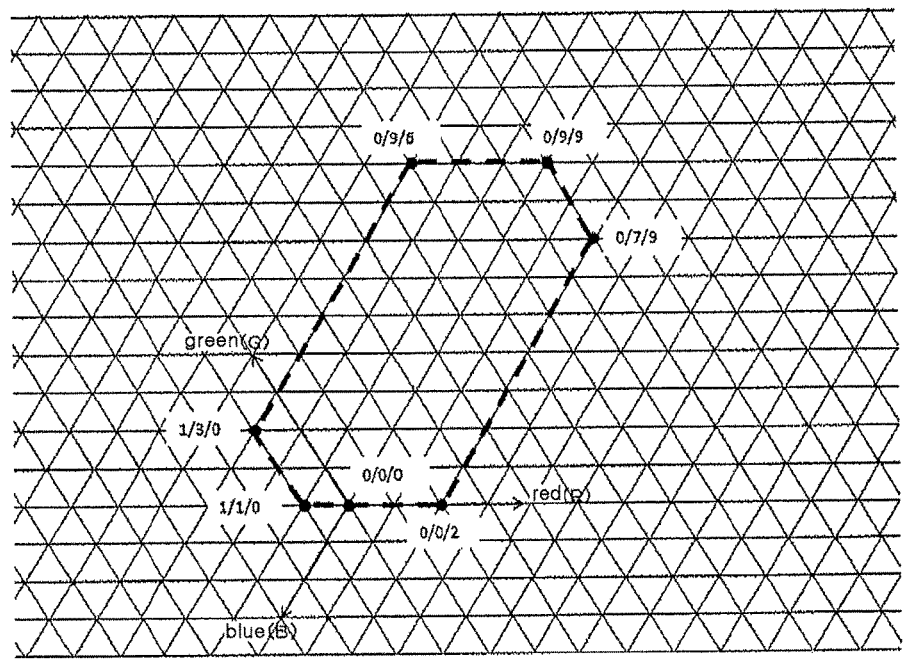
FIG. 1 is a view showing a recommended permissible range established by a CCI standard using triangular coordinates.

A first exemplary embodiment is directed to an optical glass which has an Abbe number (vd) of less than 23, wherein an ISO color contribution index (ISO/CCI) in terms of a flat plate with a thickness of 10 mm is 0 for blue (B), 9 or less for green (G), and 9 or less for red (R).

The evaluation of the ISO color contribution index (ISO/CCI) is carried out by the following method.

A flat plate having two parallel optical polished surfaces is prepared. A distance between the two optical polished surfaces, that is, the thickness of the flat plate is set to be 10 mm.

Measuring light of a predetermined wavelength is vertically incident on one optical polished surface of the glass flat plate, and then an intensity (Iout) of light transmitted through the glass flat plate is measured.

An intensity (Iin) of the measuring light prior to being incident on the glass flat plate is measured, and then the intensity (Iout) is divided by the intensity (Iin) to obtain an external transmittance.

The external transmittance of the glass flat plate in the wavelength range from 350 nm to 680 nm is calculated using a spectrophotometer. The transmittance obtained in this way is defined as a spectral transmittance, and a relative spectral transmittance is defined as a value that is obtained by multiplying a transmittance in each wavelength by a constant factor such that the maximum transmittance in the wavelength range becomes 1. Further, the relative spectral transmittance is calculated for each wavelength range of blue, green and red.

The ISO/CCI is calculated using the relative spectral transmittance $\tau(\lambda)$ of the wavelength from 350 nm to 680 nm at intervals of 10 nm, as described above. If $\tau(\lambda)$ is obtained, ISO/CCI is calculated based on the CCI standard.

The thickness of the glass flat plate that is used to measure the relative spectral transmittance $\tau(\lambda)$ is not necessarily 10 mm. Since the optical glass is homogeneous, the relative spectral transmittance is measured using two glass flat plates having different thicknesses and absorbance is obtained in each wavelength of the glass. Thereby, the relative spectral transmittance in terms of a thickness of 10 mm may be calculated, and ISO/CCI may be calculated based on the obtained value.

A method of calculating the relative spectral transmittance in terms of a thickness of 10 mm from the relative spectral transmittance in the different thicknesses is known to those skilled in the art. Likewise, it is possible to calculate the spectral transmittance and the relative spectral transmittance in any thickness.

Further, if surfaces through which the measuring light enters or exits are so smooth that a scattering loss of the measuring light is negligible, the surfaces may not be necessarily the optical polished surface. Moreover, if it may be considered that a distance between the surfaces through which the measuring light enters or exits is constant in a range where the measuring light is transmitted, the surfaces may not be necessarily flat.

When the imaging optical system falling within the recommended permissible range of the CCI standard is manufactured using the lens made of the glass having the Abbe number (vd) of less than 23, the smaller ISO color contribution index (ISO/CCI(G)) for green and the smaller ISO color contribution index (ISO/CCI(R)) for red may increase the degree of freedom in optical design. Therefore, the ISO color contribution index (ISO/CCI) in terms of a thickness of 10 mm is preferably 8.8 or less, and more preferably 8.5 or less for G.

The ISO color contribution index (ISO/CCI) in terms of a flat plate with a thickness of 10 mm is preferably 8.8 or less, and more preferably 8.5 or less for R.

The ISO color contribution index (ISO/CCI) in terms of a flat plate with a thickness of 10 mm is zero for blue (B).

For a glass having the Abbe number (vd) of less than 20, the preferred ranges of the ISO color contribution index (ISO/CCI) in terms of a flat plate with a thickness of 10 mm are as above for green (G) and red (R).

Meanwhile, when comparing a glass having the Abbe number (vd) that is 20 or more and less than 23 with the glass having the Abbe number (vd) of less than 20, the former is smaller in total content of Ti, Nb, Bi and W than the latter. Thus, color balance of the former is relatively closer to color balance of the glass material FDS90 manufactured by HOYA. Hence, for the glass having the Abbe number (vd) that is 20 or more and less than 23, the ISO color contribution index (ISO/CCI) in terms of a flat plate with a thickness of 10 mm is more preferably 7 or less and much more preferably 6 or less for green (G), and is more preferably 7 or less and much more preferably 6 or less for red (R).

The glass having the Abbe number (vd) of less than 23 has a problem that the ISO color contribution index (ISO/CCI) for green (G) and red (R) becomes large. Therefore, there is no case where the ISO color contribution index (ISO/CCI) of green (G) and red (R) becomes too small. A lower limit of the ISO color contribution index (ISO/CCI) for green (G) and red (R) in terms of a flat plate with a thickness of 10 mm may be 2.

The glass having the Abbe number (vd) of less than 23 is preferably a glass containing at least one of Ti, Nb, Bi and W, as glass components. In order to obtain the glass having the Abbe number (vd) of less than 23, it is preferable that a total content (hereinafter, referred to as "HR") of $TiO_2$, $Nb_2O_5$, $Bi_2O_3$ and $WO_3$, in terms of oxides, is 35 mol % or more. Preferably, a lower limit of HR is 37 mol %, more preferably 38 mol %, further preferably 38.5 mol %, much more preferably 39 mol %, much further preferably 40 mol %, even much more preferably 43 mol %, and even much further preferably 50 mol %. Further, an upper limit of HR is preferably 85 mol %, more preferably 80 mol %, further preferably 75 mol %, much more preferably 60 mol %, and much further preferably 55 mol %.

In the glass containing at least one of Ti, Nb, Bi and W as the glass components, the glass is preferably a phosphate optical glass to increase the transmittance for blue.

The phosphate optical glass is an optical glass that contains $P_2O_5$ as glass components and has the content of $P_2O_5$ greater than the content of $SiO_2$ as well as the content of $B_2O_3$, in mol %. For example, this glass includes an optical glass containing $P_2O_5$ of 5 mol % or more. A glass preferred as the phosphate optical glass is a glass having the content of $P_2O_5$ that is greater than a total content of $SiO_2$ and $B_2O_3$, in mol %.

As described above, in the conventional high-dispersion glass described in Patent Document 5, components having a high refractive index and a high dispersion, such as Ti, Nb, Bi or W, are reduced in the process of melting the glass, and thus absorb light on a short wavelength side of a visible light range. Thus, coloring (hereinafter, sometimes referred to as "reducing color") in the obtained optical glass is increased, that is, the transmittance for blue is decreased.

The coloring of the glass may be decreased by thermally treating the glass exhibiting the reducing color under an oxidizing atmosphere. It is believed that such a phenomenon occurs because Ti, Nb, W and Bi which are in the reduction state are oxidized and the absorption of the visible light on the short wavelength side is weakened.

However, even if the conventional glass is thermally treated under the oxidizing atmosphere, the rate of oxidizing Ti, Nb, W and Bi in the glass is low, so that the effect of decreasing the reducing color remains only slight. In order to decrease the reducing color in a short period of time, the oxidizing rate of Ti, Nb, W, Bi and the like during the thermal treatment should be fast.

In order to increase the oxidizing rate of these components, it is important to provide ions that may rapidly migrate in the glass and oxidize Ti, Nb, W, Bi and the like by exchanging charges, during the thermal treatment. It is considered that $H^+$ is suitable for use as these ions.

In order to more easily migrate $H^+$, it is effective to introduce $OH^-$ into a glass structure and hop $H^+$ from $OH^-$ as a starting point. Thus, it is believed that an oxidation rate may be increased during the thermal treatment. Such a phenomenon is particularly noticeable in the phosphate-based glass. In other words, when the optical glass is thermally treated by introducing $H^+$ and $OH^-$ as much as possible into the phosphate optical glass (i.e., increasing a water content in the optical glass as large as possible), the reducing color may be dramatically reduced and thereby the transmittance for blue may be significantly increased.

In order to obtain the optical glass according to the present exemplary embodiment, the contents of the respective glass components are adjusted such that the Abbe number (vd) becomes less than 23, and the water content is increased during the melting process of the glass such that the ISO color contribution index (ISO/CCI) in terms of a flat plate with a thickness of 10 mm is 0 for blue (B), 9 or less for green (G), and 9 or less for red (R), and a glass melt obtained by the melting process, that is, a molten glass is cooled and vitrified to obtain a glass. This glass is thermally treated in the oxidizing atmosphere.

βOH of Glass

The water content of the glass may correspond to βOH defined by the following Equation (7).

$$\beta OH = -[\ln(B/A)]/t \quad (7)$$

In the above Equation (7), t represents a thickness (mm) of the glass used to measure the external transmittance, A represents an external transmittance (%) in the wavelength of 2500 nm when light is incident on the glass to be parallel to a thickness direction thereof, and B represents an external transmittance (%) in the wavelength of 2900 nm when light is incident on the glass to be parallel to the thickness direction thereof. Further, in Equation (7), ln is a natural logarithm. The unit of βOH is $mm^{-1}$.

Further, the external transmittance means, as described above, a ratio (Iout/Iin) of the intensity (Iout) of the light transmitted through the glass to the intensity (Iin) of light incident on the glass, that is, a transmittance considering surface reflection in the surface of the glass. In contrast, an internal transmittance that will be described later means a transmittance (i.e. the transmittance of the glass material itself forming the glass) when there is no surface reflection in the glass surface. The respective transmittances are obtained by measuring transmission spectrums using the spectrophotometer.

βOH represented by the above Equation (7) means absorbance originating from a hydroxyl group. Therefore, it is possible to evaluate the concentration of water (and/or hydroxide ions; hereinafter simply referred to as "water") contained in the glass, by evaluating βOH. That is, the glass having high βOH means that the concentration of water contained in the glass, that is, the water content is high.

Therefore, the glass having high βOH contains much $H^+$ derived from water therein. Hence, $H^+$ may be rapidly migrated in the glass and charges may be exchanged by the thermal treatment, thus effectively oxidizing respective ions of Ti, Nb, W, Bi and the like. Thereby, the coloring may be dramatically decreased by the thermal treatment for a short period of time, and the glass that has been subjected to the thermal treatment has a high transmittance for blue and may decrease the color contribution index of green and red, as the high-dispersion glass.

Further, in the optical glass according to the present exemplary embodiment, the value of βOH represented by the above Equation (1) is 0.1 $mm^{-1}$ or more. Even if such an optical glass according to the present exemplary embodiment has a phosphate-based composition containing a large amount of high-refractive-index components such as Ti, Nb, W or Bi, as the glass components, it is possible to effectively decrease the reducing color through the thermal treatment.

In order to obtain the optical glass having the desired color contribution index, the value of βOH of the glass is preferably 0.1 $mm^{-1}$ or more.

Further, in order to enhance the transmittance after the thermal treatment, a lower limit of βOH is preferably 0.12 $mm^{-1}$ or more, and is more preferable as the lower limit is increased in the order of 0.15 $mm^{-1}$ or more, 0.18 $mm^{-1}$ or more, 0.20 $mm^{-1}$ or more, 0.23 $mm^{-1}$ or more, 0.25 $mm^{-1}$ or more, 0.28 mm$^{-1}$ or more, 0.30 mm$^{-1}$ or more, 0.33 mm$^{-1}$ or more, 0.35 mm$^{-1}$ or more, 0.37 mm$^{-1}$ or more, and 0.40 mm$^{-1}$ or more.

An upper limit of βOH varies depending on the type of glass or production conditions and is not particularly limited. However, if βOH increases, an amount of matter volatilizing from the molten glass tends to increase. Thus, in order to suppress volatilization from the molten glass, βOH may be preferably set to 10 mm$^{-1}$ or less, more preferably 8 mm$^{-1}$ or less, further preferably 6 mm$^{-1}$ or less, much more preferably 5 mm$^{-1}$ or less, much further preferably 4 mm$^{-1}$ or less, even much more preferably 3 mm$^{-1}$ or less, even much further preferably 2 mm$^{-1}$ or less, particularly preferably 1.0 mm$^{-1}$ or less, and most preferably 0.4 mm$^{-1}$ or less.

Since infrared light may be transmitted through even a glass that is thickly colored, it is possible to evaluate βOH regardless of whether the glass is colored or not (the presence or absence of the reducing color). Further, since the thermal treatment is usually carried out at a temperature lower than a softening point of the glass, the value of βOH of the glass is not substantially changed before and after the thermal treatment. Thus, the value of βOH may be measured at any time before and after the thermal treatment. Therefore, βOH of the glass may be measured either with a transparent glass that has been subjected to the thermal treatment (treatment for reducing the coloring) or a glass that is not subjected to the thermal treatment and thereby is thickly colored.

Noble-Metal Content of Glass

In the high-dispersion glass, a decrease in reducing color is most effective to improve the transmittance for blue. However, a decrease in content of noble metal contained in the glass also contributes to improving the transmittance for blue.

The noble metal is used for a container for melting a glass raw material, a container for accommodating the molten glass, a stirring tool for stirring and homogenizing the molten glass, and the like, at the time of melting the glass. Although the noble metal has excellent corrosion resistance, it is dissolved into the molten glass as a small amount of noble-metal ions. Since noble-metal ions dissolved into the molten glass absorb visible light, the coloring of the glass is increased.

Therefore, in order to obtain the optical glass having the desired color contribution index, according to the present exemplary embodiment, an optical glass containing the noble metal in the content of 3.0 ppm or less is preferred.

By reducing the content of the noble metal, it is possible to suppress solarization caused by the noble metal, in addition to reducing the coloring caused by the noble-metal ions. By suppressing the solarization, it is possible to maintain the desired color contribution index for a lengthy period of time.

Furthermore, it is possible to suppress light scattering caused by noble-metal particles, by reducing noble-metal particles included in the glass as foreign matter.

From the viewpoint of reducing the coloring and the solarization of the glass due to the noble-metal ions, reducing the foreign matter of the noble metal, and improving the transmittance, the noble-metal content of the optical glass according to the present exemplary embodiment is more preferably less than 2.0 ppm.

For the same reason, it is preferable to lower an upper limit of the noble-metal content. It is more preferable to reduce the upper limit in the order of 1.8 ppm, 1.6 ppm, 1.4 ppm, 1.2 ppm, 1.1 ppm, 1.0 ppm, and 0.9 ppm. Although the lower limit of the noble-metal content is not particularly limited, it is an inevitably contained amount and, for example, is expected to be about 0.001 ppm.

Examples of the noble metal may include metal simple substances such as Pt, Au, Rh or Ir, and alloys, such as Pt alloy, Au alloy, Rh alloy or Ir alloy. As the material of the melting container or a melting instrument, among the noble metal, Pt or Pt alloy that is excellent in heat resistance as well as corrosion resistance is preferred.

Therefore, it is preferable that the glass manufactured using the melting container or the melting instrument made of Pt or Pt alloy contains Pt and the content of Pt contained in the glass is 3.0 ppm or less. A more preferred upper limit of the Pt content is the same as the more preferred upper limit of the content of the noble metal contained in the glass. Further, the lower limit of the Pt content is not particularly restricted, but it is an inevitably contained amount, and, for example, is expected to be about 0.001 ppm.

Refractive Index of Glass

A refractive index (nd) of the optical glass according to the present exemplary embodiment is preferably 1.90 or more. A lower limit of the refractive index (nd) is more preferably 1.91, much more preferably 1.92, and particularly preferably 1.93. As long as it is possible to obtain the glass, an upper limit of the refractive index is not restricted. However, in order to more easily obtain the desired color contribution index, the upper limit of the refractive index (nd) is preferably 2.5, more preferably 2.2, further preferably 2.1, much more preferably 2.0, much further preferably 1.98, and even much more preferably 1.96.

When the optical system is manufactured using the optical element made of the optical glass with the high refractive index, the compactness and the high functionality of the optical system are achieved.

Clarifying Properties of Glass

Among the optical glasses according to the present exemplary embodiment, a glass treated to increase the water content in the melting process is subjected to treatment of adding water vapor to a melting atmosphere. Thus, it is expected that an amount of dissolved gas in the molten glass is increased. As a result, this leads to excellent clarifying properties, so that it is possible to shorten time required for a clarifying step in the manufacturing process, and thereby productivity is enhanced.

Glass Transition Temperature

A glass transition temperature of the optical glass according to the present exemplary embodiment is preferably 400 degrees Celsius or more, more preferably 500 degrees Celsius or more, further preferably 550 degrees Celsius or more, much more preferably 570 degrees Celsius or more, and much further preferably 600 degrees Celsius or more. If the glass transition temperature is within the above range, it is possible to increase the thermal treatment temperature of the glass in the oxidizing atmosphere and to efficiently reduce the coloring. In addition, workability for the glass, such as grinding or polishing, may be improved.

Method of Manufacturing Optical Glass

A method of manufacturing an optical glass according to the present exemplary embodiment has, for example, a melting step (i) of heating and melting a glass raw material containing phosphorus and a glass raw material containing at least one component of $TiO_2$, $Nb_2O_5$, $WO_3$ and $Bi_2O_3$ in the melting container made of the noble metal, thus obtaining a molten glass, wherein in the glass raw material, a total content (HR) of $TiO_2$, $Nb_2O_5$, $WO_3$ and $Bi_2O_3$ is 35 mol % or more, and in the melting step, at least one of treatment (ia) of adding water vapor to the melting atmosphere, and treatment (ib) of bubbling water vapor in a melt is carried out.

Generally, in the case of melting the high-refractive-index glass containing a large amount (HR≥35 mol %) of high-refractive-index components, such as $TiO_2$, $Nb_2O_5$, $WO_3$ and $Bi_2O_3$, using the melting container made of the noble metal such as platinum, the melting process may be performed under the air atmosphere. In this case, oxygen contained in the melting atmosphere may react with the noble metal constituting the melting container, and consequently the content of the noble metal contained in the resulting glass may undesirably increase.

As described above, a large amount of noble metal contained in the glass causes deterioration in transmittance or solarization. Thus, there has been proposed related art in which the melting atmosphere is adjusted to prevent the metal material constituting the melting container from being ionized and dissolved into the molten glass.

For example, if the melting atmosphere is established as a reduction side and then the glass is melted, it is possible to prevent noble-metal ions (ions of noble metal constituting the melting container) from being dissolved into the molten glass. However, if the molten glass is excessively established as the reduction side, the melting container may be alloyed by the reduced components with the high refractive index and the high-dispersion. Further, even if the molten glass is not excessively established as the reduction side, the components with the high refractive index and the high-dispersion tend to be reduced under a non-oxidizing atmosphere, and thereby the coloring degree (reducing color) of the glass becomes strong. Even if the glass having the excessively strong reducing color is subjected to the thermal treatment in a later step, the effect of decreasing the coloring remains only slight.

Therefore, in order to solve the above problems, the present inventors have found that it is important to perform the melting process in the state where the noble-metal material constituting the melting container is not ionized and dissolved into the molten glass, and to enhance the effect of decreasing the coloring (reducing color) of the resulting glass after the thermal treatment.

When manufacturing the optical glass according to the present exemplary embodiment, in the melting step, at least one of treatment of adding the water vapor to the melting atmosphere (hereinafter simply referred to as "water-vapor addition") and treatment of bubbling the water vapor in a molten substance (hereinafter simply referred to as "water-vapor bubbling") is performed. Consequently, the amount of the noble metal derived from the melting container in the melting step is extremely low, so that it is possible to dramatically improve the transmittance after the thermal treatment, and the optical glass having small coloring and very excellent transmittance is obtained.

The above-mentioned manufacturing method may effectively prevent the noble metal (e.g. platinum and the like) derived from the melting container and the like from being dissolved into the glass, so that it is possible to further decrease the coloring of the resulting optical glass due to the noble-metal ions.

By way of example, a case where the melting container is made of platinum (Pt) will be described below. The same applies to a case of using the melting container made of the metal material such as the noble metal other than platinum.

Glass is usually melted in the air atmosphere, and oxygen in the air may react with the noble-metal material, such as platinum, which is the material of the melting container. In particular, when the melting container is made of a platinum-based material, platinum dioxide ($PtO_2$) may be produced to be dissolved into the molten substance or to be dissolved, as platinum ions ($Pt^{4+}$), from an interface between the molten substance and the platinum-based material into the molten substance. Since the noble-metal ions dissolved in the molten glass absorb the visible light, the coloring of the glass tends to increase.

In order to decrease the coloring caused by such platinum ions, it is possible to employ a method where the melting atmosphere is changed into a reducing atmosphere to suppress the noble-metal ions from being dissolved into the molten glass. However, if the molten glass is excessively established as the reduction side, the melting container is alloyed, so that the strength and the durability of the melting container are considerably reduced. Further, it is possible to employ a method of substituting the melting atmosphere with inert gas. However, since the inert gas such as Ar and the like is expensive, it is not suitable for performing the melting process for a lengthy period of time.

In contrast, in the above-mentioned method of manufacturing the optical glass, in the melting step, at least one of treatment of adding the water vapor to the melting atmosphere and treatment of bubbling the water vapor in the molten substance is performed. Thereby, a partial pressure of oxygen in the melting atmosphere is decreased to prevent the platinum material constituting the melting container from being oxidized. Consequently, this may effectively prevent platinum dioxide or platinum ions ($Pt^{4+}$), produced when oxygen in the melting atmosphere reacts with the platinum material and the like, from being dissolved into the molten substance (glass), thus further reducing the amount of platinum (Pt) dissolved into the resulting optical glass. As a result, it is possible to significantly reduce the content of the noble metal in the resulting optical glass. The supply of the water vapor is believed to have the following effects, in addition to the effect of reducing the partial pressure of oxygen in the melting atmosphere. If $H_2O$ reaches the surface of platinum, it is believed that $H_2O$ is decomposed into $H^+$ and $OH^-$ by the catalytic effect of platinum, and some $OH^-$ is bonded with platinum ions, thus preventing platinum from being oxidized. The above-mentioned effects cannot be expected in inert gas such as argon or nitrogen. In practice, the content of the noble metal such as platinum in the glass may be further reduced in the supply of gas containing the water vapor rather than the supply of non-oxidizing gas in a dry state.

Since the content of noble metal, such as Pt, derived from a manufacturing instrument such as the melting container is very small, the coloring of the glass by ultraviolet irradiation called the solarization is little. Therefore, in the case of using such a glass as the optical element, for example, a change of transmittance over the time is small. Further, even if ultraviolet rays are radiated onto the optical element when the optical element is attached using an ultraviolet curing adhesive, the transmittance is not lowered.

Although raw material components having a high water content, such as hydroxide including orthophosphoric acid, aluminum hydroxide, calcium hydroxide and the like, are used as the glass raw material, water is evaporated in the process of making molten glass by melting the glass raw material or in the state of hot molten glass. Further, even when compounds are blended to make a batch raw material, the batch raw material is roughly melted to make cullet, the cullet is re-blended and remelted in the melting container, thus obtaining a glass, water originally contained in the batch raw material disappears at the time of creating the cullet as well as in the remelting process in the melting container. Therefore, unless an operation of supplying water to the molten glass is performed in the melting process even if any method is used, the water content of the glass shows a tendency to be decreased.

In the case of melting the glass under the non-oxidizing atmosphere to prevent the elution of the noble metal derived from the melting container, the water content of the glass tends to become smaller. Generally, the glass is melted under the air atmosphere, but the air contains a certain amount of water. However, when the non-oxidizing atmosphere is adopted as the melting atmosphere, it is necessary to substitute the melting atmosphere having non-oxidizing gas such as reducing gas or inert gas that are usually drying gas. Therefore, the water content of the resulting glass becomes smaller than that of the glass melted under the air atmosphere.

Even if the glass having the low water content as such is subjected to the thermal treatment under the oxidizing atmosphere, the effect of reducing the coloring remains slight.

In contrast, it is possible to compensate for the loss of water that is evaporated from the hot molten glass, by feeding water from an outside to the molten glass. Therefore, this method makes it easy to increase the water content of the optical glass, thus allowing the coloring to be significantly reduced after the thermal treatment.

Therefore, in the melting step, it is preferable to perform at least one of treatment of adding the water vapor to the melting atmosphere (hereinafter, simply referred to as "water-vapor addition") and treatment of bubbling the water vapor in the molten substance (hereinafter, simply referred to as "water-vapor bubbling").

The method of adding the water vapor to the melting atmosphere is not particularly limited. However, for example, this method may be performed as follows: a connecting pipe is inserted from an opening formed in a melting device into a crucible, and gas containing water vapor is fed through this pipe into a space defined in the crucible, as necessary.

A flow rate of the water-vapor containing gas fed into the space in the crucible is not particularly limited. The flow rate may be adjusted based on a measured result of βOH of an experimentally manufactured glass, or may be adjusted based on a measured result by thermally treating the experimentally manufactured glass in the oxidizing atmosphere and then measuring the transmittance. For example, in the case of feeding water vapor into the substantially closed melting container, if a relatively small amount of water vapor is supplied, a desired glass is obtained. On the other hand, when the glass is melted with an uncovered crucible being put in the glass melting furnace, a volume in the glass melting furnace is larger than a volume in the crucible, so that a relatively large amount of water vapor is fed into the glass melting furnace. Based on the experimental results, by feeding the supply amount of the water vapor, namely, the flow rate of the gas back to next production, it is possible to produce the glass having the desired transmittance by the thermal treatment in the oxidizing atmosphere. Hereinafter, the values of a flow rate of gas, a flow rate of water vapor, a flow rate added to the atmosphere and a supply amount of water vapor are represented in terms of 25 degrees Celsius and 1 atm.

Further, the bubbling method may employ known methods without being particularly limited. Examples of the bubbling method may include a method where a pipe made of a platinum material or a platinum alloy material is fitted into the molten substance in the melting container and then water-vapor containing gas is blown through the pipe into the molten substance, a method where a pipe made of the same material as the melting container is mounted around a bottom of the melting container and then water-vapor containing gas is blown from the pipe into the molten substance, and the like.

A bubble diameter of the water-vapor containing gas that is blown into the molten substance is preferably in the range of 0.01 to 100 mm, and more preferably in the range of 0.1 to 30 mm. Within the above-described range, it is believed that the amount of water in the molten glass is effectively increased. If the bubble diameter is too small, a problem where the bubbling pipe inserted into the molten substance is likely to be clogged occurs.

The flow rate of the water-vapor containing gas that is blown into the molten substance may be adjusted based on the measured result of βOH of the experimentally manufactured glass without being particularly limited. For example, when βOH of the experimentally manufactured glass is measured and the measured result is smaller than a desired value, the flow rate of the gas is adjusted to be increased. On the other hand, when the measured result is larger than a desired βOH value, the flow rate of the gas is adjusted to be reduced. As such, it is sufficient to experimentally calculate βOH of the glass and then adjust the flow rate of the gas based on the measured result. In this way, based on the measured result of βOH of the experimentally manufactured glass, or based on the result of the transmittance measured after the experimentally manufactured glass is subjected to thermal treatment in the oxidizing atmosphere, the supply amount of the water vapor, that is, the flow rate of the gas is fed back to the next product, so that it is possible to produce a desired glass.

The content of the water vapor in the water-vapor containing gas is preferably 3 vol % or more. The higher content of the water vapor is preferred. The content of the water vapor is preferably 10 vol % or more, more preferably 20 vol % or more, further preferably 30 vol % or more, much more preferably 40 vol % or more, much further preferably 50 vol % or more, even much more preferably 60 vol % or more, even much further preferably 70 vol % or more, particularly preferably 80 vol % or more, particularly more preferably 90 vol % or more. Especially in the glass that is finally obtained when the content of the water vapor is within the above range, it is possible to enhance the effect of reducing the coloring, reduce the content of the noble metal, and improve the clarifying properties.

Further, the water-vapor containing gas may be produced gas, commercially available gas, or gas mixture with other gases. Examples of other gases may include non-oxidizing gas or air. Among them, the non-oxidizing gas is preferred.

In the method of manufacturing the glass, it is preferable to supply the non-oxidizing gas as well as the water vapor, in either or both of the treatment (ia) of adding the water vapor and the treatment (ib) of bubbling the water vapor in the molten substance.

Some of the supplied water vapor may be substituted with the non-oxidizing gas.

Although the non-oxidizing gas is not particularly limited, for example, argon, nitrogen, carbon monoxide, carbon dioxide, hydrogen, helium and iodine may be used as the non-oxidizing gas. Inert gas such as argon is preferred.

The supply amount of the non-oxidizing gas is not particularly limited. Preferably, assuming that the volume of supplied gas (water-vapor containing gas) is 100 vol %, a percentage occupied by the non-oxidizing gas is more than 0 vol % and is 97 vol % or less. A more preferable upper limit of the non-oxidizing gas is 90 vol %. As the upper limit is reduced in the order of 80 vol %, 70 vol %, 60 vol %, 50 vol %, 40 vol %, 30 vol %, 20 vol % and 10 vol %, the effect of reducing the coloring by the thermal treatment is preferably enhanced.

Except for the particulars described herein in the method of manufacturing the optical glass, a glass-raw-material regulating method, a glass-raw-material heating method, a melting method, and a molten-glass molding method may appropriately adopt known methods. Further, the glass raw material or the material forming the melting container, which are used in the method of manufacturing the optical glass, may appropriately employ known materials.

The material forming the melting container that is used to manufacture the glass may appropriately employ a material (e.g., metal material or quartz material, etc.) having heat resistance and corrosion resistance generally at temperature and atmosphere for melting the molten glass.

However, depending on the composition of a glass to be manufactured, a molten product exhibiting considerable corrosivity may be produced, or the molten glass may react with the material forming the melting container and the like, so that the melting container may be sometimes melted. Therefore, when the material forming the melting container and the like is selected, it is preferable to appropriately select a material depending on the glass composition.

For example, in the case of the phosphate optical glass (glass containing at least one oxide selected from a group consisting of $P_2O_5$, $TiO_2$, $Nb_2O_5$, $WO_3$ and $Bi_2O_3$) containing components with the high refractive index and the high-dispersion, a molten product having considerable corrosivity is produced particularly when a batch raw material is heated and melted. Since such a molten product tends to corrode even a material having excellent corrosion resistance, such as platinum, the noble-metal material such as platinum may be undesirably corroded by the molten product to be dissolved into the molten substance, thus generating foreign matter, or increasing the coloring of the glass.

Therefore, in the case of manufacturing the phosphate optical glass, a material of the melting container used to heat and melt the batch raw material is preferably selected, separately from a material used at the end of the melting step or the clarifying step. As the melting container used to heat and melt the batch raw material, a container or an instrument made of quartz or refractory material is preferred. The reason is because the refractory material such as quartz is corroded by the molten product but becomes part of the glass composition even if the refractory material is corroded and included in the molten substance, so that a problem occurring in the noble metal material is rarely found in the refractory material. At the end of the melting step or the clarifying step, the problem where the molten product corrodes the noble metal material rarely occurs, so that it is preferable to use the container or the instrument made of the noble metal such as platinum or platinum alloy.

Meanwhile, in the case of borate glass (glass containing at least one oxide selected from a group consisting of $TiO_2$, $Nb_2O_5$, $WO_3$ and $Bi_2O_3$) containing $Bi_2O_3$, and components with the high refractive index and the high dispersion, the problem of the phosphate glass where the molten product corrodes the noble metal material is decreased. Rather, in the case of the borate glass, the container made of the refractory material such as quartz tends to be considerably corroded. Therefore, as the melting container, it is preferable to use the container or the instrument made of the noble metal material, such as platinum or platinum alloy, which is resistant to corrosion in the process of manufacturing the glass.

In the method of manufacturing the optical glass, the heating/melting step preferably includes a clarifying step of promoting the degassing of the molten glass and a homogenization step of cooling down the molten glass that has been subjected to the clarifying step to provide a viscosity suitable for molding and simultaneously stirring the molten glass to homogenize it, in addition to the melting step of making the molten glass by generally heating and melting the glass raw material.

As the glass raw material, a blended raw material (batch raw material) or a blended cullet may be used, which is obtained by weighing raw materials corresponding to the glass components and sufficiently mixing them with each other in order to attain an optical glass having desired properties.

In the case of using the cullet as the glass raw material, a cullet formation step (rough melt step) of roughly melting the batch raw material to form the cullet is performed prior to the melting step (remelt step). Preferably, the refractive index of the cullet is previously measured. If a measured value of the refractive index is equal to a desired value, this cullet is employed as the blended cullet. On the contrary, if the measured value of the refractive index deviates from the desired value, a cullet having a refractive index that is higher than the desired value and a cullet having a refractive index that is lower than the desired value are mixed with each other, so that this mixture is employed as the blended cullet.

Although the cullet is composed of glass, the glass is not necessarily a homogenous glass. Further, the cullet may contain bubbles. Furthermore, the cullet may contain non-molten substances of the batch raw material. The composition and the optical characteristics (e.g., refractive index, Abbe number, etc.) of the cullet adopt the composition and the optical characteristics of a glass that is made by remelting the cullet such that the glass is homogeneous and contains no bubble.

Even in both the cullet manufacturing method (rough melt-remelt method) and the method (batch direct method) of directly melting the batch raw material in the melting step, in order to suppress Ti, Nb, W and Bi from being excessively reduced, to suppress the metal material from being ionized when the melting container is made of the metal material, and to ensure a water content in the glass, the glass heating temperature during the heating/melting step is preferably maintained in the range of 800 to 1500 degrees Celsius, more preferably maintained to be 1400 degrees Celsius or less, and much more preferably maintained to be 1300 degrees Celsius or less. Further, in order to improve the clarifying properties and facilitate a significant reduction in coloring when the glass is thermally treated in the oxidizing atmosphere, the glass heating temperature of the heating/melting step is preferably set to be the highest in the clarifying step, that is, it is preferable to melt the glass at the clarifying temperature or less.

If time from the start of the heating/melting step to the end thereof is lengthened, when the components with the high refractive index and the high dispersion are reduced and the melting container is made of the metal material, the ionization of the metal material is promoted and the water content in the glass tends to be lowered. Therefore, the time from the start of the heating/melting step to the end thereof is preferably set to be within 100 hours. Further, the time from the start of the heating/melting step to the end thereof is appropriately adjusted depending on a capacity of the melting container.

The method of manufacturing the optical glass is more preferably performed by the rough melt-remelt method. The rough melt-remelt method has the rough melt step of melting blended materials to obtain the cullet, and the remelt step of remelting the cullet to obtain the glass. In at least one of the rough melt step and the remelt step, it is preferable to perform at least one of the treatment (ia) of adding the water vapor to the melting atmosphere and the treatment (ib) of bubbling the water vapor in the molten substance.

Particularly, in the case of manufacturing the glass by the rough melt-remelt method, the melting temperature (rough melt temperature) of the batch raw material during the rough melt preferably ranges from 800 to 1400 degrees Celsius. The solubility of dissolved gas decreases with the increase in temperature of the molten substance. Therefore, in order to further enhance the clarifying effect, the temperature of the molten substance in the rough melt step is preferably equal to or less than the melting temperature (remelt temperature) of the cullet in the remelt step, and is preferably lower than the clarifying temperature particularly in the remelt step.

Further, the melting time in the rough melt step may be appropriately adjusted in view of a capacity of the crucible and an amount of the batch raw material put into the crucible. For example, the melting time may be in the range of 0.1 to 100 hours, and more preferably 0.1 to 20 hours.

The melting temperature (remelt temperature) of the blended cullet in the remelt step is preferably in the range of 800 to 1500 degrees Celsius. However, in order to further enhance the clarifying effect, the remelt temperature is preferably set to be lower than the clarifying temperature. The melting time in the remelt step may be appropriately adjusted in view of the capacity of the crucible and an amount of the blended cullet put into the crucible. For example, the melting time during the remelting may be in the range of 0.1 to 100 hours, and more preferably 2 to 20 hours.

Although the atmosphere during the melting is not particularly limited, it is preferable to add the water vapor to the melting atmosphere so as to effectively increase the amount of water in the molten glass.

The melting atmosphere may be set such that the melting process is first initiated in the melting atmosphere other than water-vapor atmosphere, for example, the air atmosphere or nitrogen atmosphere, and subsequently water vapor is added to the melting atmosphere. Alternatively, the melting atmosphere may be preset to be the water-vapor atmosphere.

When the treatment of adding the water vapor to the melting atmosphere is performed, water-vapor partial pressure of the melting atmosphere is higher than water-vapor partial pressure in the air, and more preferably is higher than oxygen partial pressure. Further, an upper limit of the water-vapor partial pressure is not particularly restricted. For example, the melting atmosphere may be completely substituted with water vapor.

Also, an increase in the water-vapor partial pressure in the melting atmosphere throughout the melting step may effectively prevent oxygen from reacting with the melting container made of the noble metal material such as platinum, and may reduce the dissolved amount of Pt and the like in the glass, thus effectively preventing the transmittance from being deteriorated (lowered). Further, the content of the dissolved gas is maintained until just the clarifying step ago, so that the effect of improving the clarifying properties is increased.

For the purpose of homogenizing the molten substance, the molten substance may be stirred in the melting step. The stirring method may employ known methods. Examples of the stirring method may include a method of bubbling gas in the molten substance or a method of stirring the molten substance via a stirring rod.

Particularly, the bubbling using the water-vapor containing gas or the stirring of the molten substance in the melting atmosphere to which water vapor is added is preferred from the viewpoint of promoting the homogenization of the molten substance and increasing the content of water in the molten glass.

After the melting step (i) of heating and melting the glass raw material in the melting container to obtain the molten glass, a step (ii) of discharging the molten glass out from the melting container and a step (iii) of molding the molten glass are further provided.

At the discharging step (ii), the molten glass that has been clarified and homogenized is discharged out from a glass discharge pipe that is mounted on the bottom of the melting container. A temperature of the glass discharge pipe is within a temperature range in which the flowing molten glass is not devitrified, and is adjusted and maintained so that the glass has a viscosity suitable for molding.

At the molding step (iii), any known molding method is possible as long as the molten glass in the melting container may be molded in a predetermined shape. For example, the molten glass may be poured into a mold to have the shape of a block, or a linear molten glass stream flowing down from the pipe may be cut in predetermined length (predetermined amount) to form a glass gob. In a later step, when shaping with higher accuracy is performed, individual glasses obtained by the molding step may vary considerably in shape. The obtained glasses may be thickly colored. The coloring may be reduced by performing the thermal treatment in the later step.

At least one of the discharging step (ii) and the molding step (iii) is preferably performed under the oxidizing atmosphere. Thus, the reducing color of the glass may be effectively decreased.

The reducing color derived generally from the components with the high refractive index and the high dispersion may be decreased by thermally treating the glass in the oxidizing atmosphere. Particularly, Ti, Nb, W, Bi and the like tend to be rapidly oxidized as the temperature of the glass becomes high.

Therefore, a glass having temperature as high as possible, that is, the glass of the melting step (i) is exposed to the oxidizing atmosphere. However, when the melting container, a clarifying tub and the like are made of the noble-metal material, the glass of the melting step (i) is in contact with the noble-metal material. Hence, if the melting atmosphere adopts the oxidizing atmosphere, the noble-metal material may react with oxygen in the atmosphere and thereby noble-metal ions may be undesirably dissolved into the glass.

Meanwhile, the glass of the discharging step (ii) and the molding step (iii) is lower in temperature than the glass of the melting step (i), but is sufficiently higher than glass that is cooled down after the molding. Therefore, even in the steps, the effect of sufficiently reducing the coloring of the glass by exposing the glass to the oxidizing atmosphere is expected. Further, since the glass is not in contact with the noble-metal material constituting the melting container and the like at the discharging step (ii) and the molding step (iii), it is believed that the above-described problem rarely occurs.

Therefore, by performing at least one of the discharging step (ii) and the molding step (iii) under the oxidizing atmosphere, it is possible to efficiently decrease the reducing color while preventing the noble-metal material from being dissolved into the molten glass.

Since a molten glass stream is larger than the glass block in the mold in surface area of the glass exposed to the oxidizing atmosphere per unit volume, it is possible to more efficiently decrease the reducing color.

Further, by decreasing the reducing color of the glass in at least one of the discharging step (ii) and the molding step (iii), it is possible to easily inspect the interior of the glass after the molding step (iii), for example, the presence of bubbles or precipitates. Consequently, it is possible to precisely inspect the glass of good quality at an early stage, so that a yield is improved.

In the method of manufacturing the optical glass, it is preferable to thermally treat the molded glass in the oxidizing atmosphere. Thus, it is possible to significantly reduce the coloring of the obtained glass. The glass that has been subjected to the thermal treatment is little in coloring and thereby is high in transparency. That is, this glass is high in transmittance for the visible region, particularly for blue.

At the thermal treatment step (iv), the thermal-treatment temperature and the thermal-treatment time are appropriately set to obtain desired optical characteristics. For example, preferably, the thermal-treatment temperature is lower than the softening point of the glass, and is equal to or more than a temperature that is lower than the glass transition temperature Tg by 100 degrees Celsius (Tg–100 degrees Celsius).

Further, if the thermal-treatment temperature is high when the coloring of the glass is reduced up to a predetermined level, it is possible to shorten the thermal-treatment time. Likewise, if the oxygen partial pressure in the oxidizing atmosphere is increased, it is possible to shorten the thermal-treatment time. Although the thermal-treatment time varies depending on the thermal-treatment temperature or the oxygen partial pressure in the oxidizing atmosphere, the thermal-treatment time is set such that the coloring of the glass reaches a desired level. Typically, the thermal-treatment time is preferably in the range of 0.1 to 100 hours.

At the discharging step (ii), the molding step (iii) and the thermal treatment step (iv), the oxidizing atmosphere is an atmosphere that is higher in oxygen partial pressure than the air atmosphere or the air, and is preferably an atmosphere that is higher in oxygen partial pressure than the air.

Although the method for creating the oxidizing atmosphere is not particularly limited, examples of the method may include a method of supplying the oxidizing atmosphere gas and the like. As the oxidizing atmosphere gas, gas containing oxygen may be employed. The concentration of oxygen is approximately equal to or more than that of the air, for example. Examples of the oxidizing atmosphere gas may include the air, gas obtained by adding oxygen to the air, gas substantially composed of only oxygen, and the like.

For Glass Composition

Next, the composition of the optical glass according to the present exemplary embodiment will be described.

Hereinafter, unless otherwise stated, the contents and the total content of the glass components and the content of additives are expressed by mol % in terms of oxides.

As described above, the optical glass according to the present exemplary embodiment is preferably the phosphate optical glass, and contains at least one oxide (hereinafter sometimes referred to as "components with high refractive index and high dispersion") selected from a group consisting of $TiO_2$, $Nb_2O_5$, $WO_3$ and $Bi_2O_3$, as the glass components. Preferably, the total content of $TiO_2$, $Nb_2O_5$, $WO_3$ and $Bi_2O_3$ contained in the glass is 35 mol % or more, preferably 37 mol % or more, more preferably 38 mol % or more, further preferably 38.5 mol % or more, much more preferably 39 mol % or more, much further preferably 40 mol % or more, even much more preferably 43 mol % or more, and even much further preferably 50 mol % or more. If the total content of $TiO_2$, $Nb_2O_5$, $WO_3$ and $Bi_2O_3$ exceeds 85 mol %, devitrification resistance tends to be deteriorated. Thus, in order to maintain the devitrification resistance, the total content of $TiO_2$, $Nb_2O_5$, $WO_3$ and $Bi_2O_3$ is preferably 85 mol % or less, more preferably 80 mol % or less, further preferably 75 mol % or less, much more preferably 60 mol % or less, and much further preferably 55 mol % or less.

The phosphate optical glass is preferred because the contents of $TiO_2$, $Nb_2O_5$, $WO_3$ and $Bi_2O_3$ in the glass are increased. In the phosphate optical glass, the migration rate of $H^+$ becomes fast during the heat treatment, thus allowing the coloring to be reduced by heat treatment of short time compared to other composition type.

The present exemplary embodiment may be applied to the glass composition comprising the known composition wherein the contents of $TiO_2$, $Nb_2O_5$, $WO_3$ and $Bi_2O_3$ are within the above range, in addition to the composition illustrated in the examples.

Next, the preferred glass composition according to the present exemplary embodiment will be described.

$P_2O_5$ is a component for forming a glass network, and functions to maintain the thermal stability of the glass. If the content of $P_2O_5$ is less than 7%, the thermal stability tends to decline. Thus, it is preferable that the content of $P_2O_5$ is 7% or more. If the content of $P_2O_5$ is more than 40%, the refractive index declines. Therefore, it is preferable that the content of $P_2O_5$ is in the range of 7 to 40%. A more preferable lower limit of the content of $P_2O_5$ is 10%, a much more preferable lower limit thereof is 12%, a still more preferable lower limit thereof is 15%, and an even still more preferable lower limit thereof is 18%. A more preferable upper limit of the content of $P_2O_5$ is 35%, a much more preferable upper limit thereof is 33%, a still more preferable upper limit thereof is 30%, and an even still more preferable upper limit thereof is 28%.

$SiO_2$ is poorly soluble in the glass having the $P_2O_5$-based composition. If a large amount of $SiO_2$ is introduced into the glass, melting residues are generated, so that the homogeneity of the glass tends to be deteriorated. If the melting temperature rises to prevent the melting residues from being generated, the noble-metal content is increased, and the coloring of the glass is also increased. Hence, the content of $SiO_2$ is less than the content (M) of $P_2O_5$. A relation between the content of $SiO_2$ and M (content [%] of $P_2O_5$) is as follows: the content of $SiO_2$ is preferably in the range of 0% to 0.8×M [%], more preferably in the range of 0% to 0.5×M [%], still more preferably in the range of 0% to 0.3×M [%], and even still more preferably in the range of 0% to 0.15×M [%].

A small content of $B_2O_3$ functions to improve the devitrification resistance. A relation between the content of $B_2O_3$ and M (content [%] of $P_2O_5$) is as follows: the content of $B_2O_3$ is 0% or more and less than M [%], is preferably in the range of 0% to 0.9×M [%], is more preferably in the range of 0% to 0.7×M [%], is further preferably in the range of 0% to 0.6×M [%], is much more preferably in the range of 0% to 0.5×M [%], is much further preferably in the range of 0% to 0.4×M [%], and is even much more preferably in the range of 0% to 0.35×M [%].

$TiO_2$, $Nb_2O_5$, $WO_3$ and $Bi_2O_3$ function to increase the refractive index as well as the dispersion, in addition to improving chemical durability. However, if each of the contents of $TiO_2$, $Nb_2O_5$, $WO_3$ and $Bi_2O_3$ is increased, the devitrification resistance tends to be deteriorated.

From the viewpoint of maintaining the devitrification resistance, an upper limit of the content of $TiO_2$ is preferably 40%, more preferably 35%, further preferably 33%, and much more preferably 30%. In order to obtain the effect of introducing $TiO_2$, a lower limit of the content of $TiO_2$ is preferably 1% and more preferably 3%. The content of $TiO_2$ may be 0%.

From the viewpoint of maintaining the devitrification resistance, an upper limit of the content of $Nb_2O_5$ is preferably 45%, more preferably 40%, and further preferably 35%. In order to obtain the effect of introducing $Nb_2O_5$, a lower limit of the content of $Nb_2O_5$ is preferably 5%, more preferably 8%, and further preferably 11%. The content of $Nb_2O_5$ may be 0%.

The content of $WO_3$ is preferably in the range of 0 to 30%. In order to obtain the effect of introducing $WO_3$, a lower limit of the content of $WO_3$ is preferably 1%, more preferably 3%, and further preferably 5%. Further, in order to maintain the devitrification resistance, an upper limit of the content of $WO_3$ is preferably 27%, more preferably 24%, further preferably 20%, and much more preferably 18%. The content of $WO_3$ may be 0%.

The content of $Bi_2O_3$ is preferably in the range of 0 to 35%. In order to obtain the effect of introducing $Bi_2O_3$, a lower limit of the content of $Bi_2O_3$ is preferably 1%, more preferably 3%, and further preferably 5%. Further, in order to maintain the devitrification resistance, an upper limit of the content of $Bi_2O_3$ is preferably 30%, more preferably 28%, and further preferably 24%. The content of $Bi_2O_3$ may be 0%.

A total content of $Bi_2O_3$ and $B_2O_3$ is preferably less than 50%, more preferably less than 45%, and still more preferably 40%.

A divalent metal component such as BaO, SrO, CaO, MgO, or ZnO functions to improve the melting property of the glass and reduce the coloring of the glass. Further, a proper content of components serves to improve the devitrification resistance. However, since an excessive content of components tends to lower the refractive index and deteriorate the devitrification resistance, a total content of BaO, SrO, CaO, MgO and ZnO is preferably in the range of 0 to 40%, and more preferably in the range of 0 to 32%. An upper limit of the total content of BaO, SrO, CaO, MgO and ZnO is preferably 30%, more preferably 27%, and further preferably 25%. A lower limit of the total content of BaO, SrO, CaO, MgO and ZnO is preferably 0.1%, more preferably 0.5%, and further preferably 1%.

Among these divalent metal components, BaO is a component that is effective to maintain the high refractive index. Thus, the content of BaO is preferably in the range of 0 to 40%, and more preferably in the range of 0 to 32%. An upper limit of the content of BaO is preferably 30%, more preferably 27%, and further preferably 25%. A lower limit of the content of BaO is preferably 0.1%, more preferably 0.5%, and further preferably 1%. The content of BaO may be 0% as well.

Alkali metal oxide such as $Li_2O$, $Na_2O$ or $K_2O$ serves to improve the melting property of the glass and reduce the coloring of the glass. Further, the alkali metal oxide also functions to lower the glass transition temperature, the softening temperature, and the heat treating temperature of the glass. However, an excessive content of alkali metal oxide tends to lower the refractive index and deteriorate the devitrification resistance, so that a total content of $Li_2O$, $Na_2O$ and $K_2O$ is preferably in the range of 0 to 40%, more preferably in the range of 0 to 35%, further preferably in the range of 0 to 32%, and much more preferably in the range of 0 to 30%. Each of the contents of $Li_2O$, $Na_2O$ and $K_2O$ may be 0% as well. Particularly, in the case of using $Li_2O$ as the alkali metal oxide, in order to obtain the high-refractive-index glass, the content of $Li_2O$ in the manufactured glass is more preferably more than 0% and less than 10%, much more preferably more than 0% and 9% or less, and particularly preferably more than 0% and 8% or less.

A small content of $Al_2O_3$ serves to improve the devitrification resistance, while an excessive content of $Al_2O_3$ lowers the refractive index. Thus, the content of $Al_2O_3$ is preferably in the range of 0 to 12%, more preferably in the range of 0 to 7%, and further preferably in the range of 0 to 3%.

$ZrO_2$ serves to increase the refractive index. A small content of $ZrO_2$ serves to improve the devitrification resistance. However, an excessive content of $ZrO_2$ tends to deteriorate the devitrification resistance or the melting property. Therefore, the content of $ZrO_2$ is preferably in the range of 0 to 16%, more preferably in the range of 0 to 12%, further preferably in the range of 0 to 7%, and much more preferably in the range of 0 to 3%.

$GeO_2$ serves to increase the refractive index while maintaining the devitrification resistance. Although $GeO_2$ functions to increase the refractive index, it does not increase the coloring of the glass, unlike $TiO_2$, $Nb_2O_5$, $WO_3$ and $Bi_2O_3$. Since $GeO_2$ is a very expensive component as compared to other components, a smaller content of $GeO_2$ is preferred to reduce the manufacturing cost of glass. Therefore, in order to widely spread a glass product with the high refractive index, it is required to provide the high-refractive-index glass with excellent transmittance while reducing the content of $GeO_2$. According to the present embodiment, when the total content of $TiO_2$, $Nb_2O_5$, $WO_3$ and $Bi_2O_3$ is 20% or more, it is possible to provide the high-refractive-index glass with excellent transmittance without using a large content of $GeO_2$.

In this respect, the content of $GeO_2$ is preferably in the range of 0 to 10%, more preferably in the range of 0 to 5%, further preferably in the range of 0 to 3%, much more preferably in the range of 0 to 2%, much further preferably in the range of 0 to 1%, and even much more preferably in the range of 0 to 0.5%. $GeO_2$ may not be contained. Further, an effective content of $GeO_2$ may be preferably used if it is unnecessary to consider the manufacturing cost.

$TeO_2$ serves to increase the refractive index while maintaining the devitrification resistance. In order to relieve a load on environment, the content of $TeO_2$ is preferably in the range of 0 to 10%, more preferably in the range of 0 to 5%, further preferably in the range of 0 to 3%, much more preferably in the range of 0 to 2%, much further preferably in the range of 0 to 1%, and even much more preferably in the range of 0 to 0.5%. $TeO_2$ may not be contained.

$Sb_2O_3$ has an oxidizing action, and functions to suppress the reduction of $TiO_2$, $Nb_2O_5$, $WO_3$ and $Bi_2O_3$. However, $Sb_2O_3$ itself has absorption in the visible region, and oxidizes the melting container made of the noble metal by the oxidizing action thereof, thus causing the noble-metal ions from being dissolved into the molten glass. Therefore, a preferable range of the content of $Sb_2O_3$ is 0 ppm or more and less than 1000 ppm. In this respect, an upper limit of the content of $Sb_2O_3$ is more preferable as it is decreased in the order of 900 ppm, 800 ppm, 700 ppm, 600 ppm, 500 ppm, 400 ppm, 300 ppm, 200 ppm, and 100 ppm. $Sb_2O_3$ may not be contained.

If components other than the above-described components are contained in large quantities, the devitrification resistance of the glass may be deteriorated and a liquid-phase temperature may tend to rise. Hence, it is required to increase the glass melting temperature, the corrosion of the melting container made of the noble-metal material is increased, and the amount of the noble metal dissolved into the glass is increased. Further, the reducing color of $TiO_2$, $Nb_2O_5$, $WO_3$ and $Bi_2O_3$ is increased.

In order to suppress such an increase in amount of the noble metal and the coloring of the glass, a total content of $P_2O_5$, $SiO_2$, $B_2O_3$, $TiO_2$, $Nb_2O_5$, $WO_3$, $Bi_2O_3$, $MgO$, $CaO$, $SrO$, $BaO$, $ZnO$, $Li_2O$, $Na_2O$, $K_2O$, $Al_2O_3$, $ZrO_2$, $GeO_2$, $TeO_2$ and $Sb_2O_3$ is preferably 90% or more, more preferably 92% or more, further preferably 95% or more, much more preferably 96% or more, much further preferably 97% or more, even much more preferably 98% or more, and even much further preferably more than 99%. Further, the total content may be 100%.

$Ta_2O_5$, $Y_2O_3$, $La_2O_3$, $Gd_2O_3$, $Yb_2O_3$, $In_2O_3$, $Ga_2O_3$, $SnO_2$, $CeO_2$, F and the like may be contained as long as the content of each component is small. A total content of $Ta_2O_5$, $Y_2O_3$, $La_2O_3$, $Gd_2O_3$, $Yb_2O_3$, $In_2O_3$, $Ga_2O_3$ and F is preferably in the range of 0 to 10%, more preferably in the range of 0 to 7%, further preferably in the range of 0 to 5%, much more preferably in the range of 0 to 3%, much further preferably in the range of 0 to 1%, and even much more preferably in the range of 0 to 0.5%.

Considering that F increases the volatility of the molten glass, F is not an ingredient that needs to be included in a large amount in obtaining a homogeneous glass and a glass having stable optical characteristics. The content of F is preferably in the range of 0 to 3%, more preferably in the range of 0 to 1%, and further preferably in the range of 0 to 0.5%. It is much more preferable not to contain F substantially.

In order to relieve a load on environment, it is preferable that Pb, As, Cd, U, Th and Tl are not substantially contained.

In order to reduce the coloring of the glass, it is preferable that components and additives having absorption in the visible region, such as Cu, Cr, Mn, Fe, Co, Ni, V, Mo, Nd, Eu, Er, Tb, Ho or Pr, are not substantially contained.

However, a case where the optical glass according to the present exemplary embodiment contains inevitable impurities is not excluded. The expression "not substantially contained" means that the content is less than 0.5 mol %. Since it is preferable that the glass has no components and additives that are not substantially contained, their contents are preferably less than 0.1 mol %, more preferably less than 0.08 mol %, further preferably less than 0.05 mol %, much more preferably less than 0.01 mol %, and much further preferably less than 0.005 mol %.

Further, known glass raw materials such as oxide, phosphoric acid, phosphate (polyphosphate, metaphosphate, pyrophosphate, etc.), boric acid, anhydrous boric acid, carbonate, nitrate, sulfate, or hydroxide may be used, depending on the glass components, as the glass raw material.

Optical Element

The optical element according to the present exemplary embodiment is composed of the optical glass according to the exemplary embodiment.

In order to make the optical element using the optical glass according to the exemplary embodiment, known methods may be applied. For example, a molten glass is molded to prepare a glass material for press molding. Next, this glass material is reheated and press-molded to make an optical-element blank. Further, an optical element is manufactured by processing the optical-element blank through various steps including a polishing step.

Alternatively, a molten glass is molded to prepare a glass material for press molding, and then this glass material is heated and is subjected to precision-press molding to make an optical element.

In each of the above-described steps, the molten glass may be molded to prepare a glass molded product, and the glass molded product may be processed to produce a glass material for press molding.

Alternatively, a molten glass is molded to prepare a glass molded product, and then this molded product is processed to produce an optical element.

An optical functional face of the manufactured optical element may be coated with an anti-reflection film, a total reflection film or the like according to an intended use.

Examples of the optical element may include various lenses, such as a spherical lens, a non-spherical lens, a macro lens or a lens array, a prism, a diffraction grating and the like.

Although the exemplary embodiments of the present invention have been described above, those skilled in the art will appreciate that the present invention is not limited to the exemplary embodiments and various modifications are possible without departing from the scope and spirit of the invention.

Since the optical glass according to the present exemplary embodiment is suitable for use as the material for the optical element, the optical glass is preferably an amorphous glass. As the method of manufacturing the glass optical element, for example, a method of heating, softening and then molding the glass material may be adopted. This molding method is unsuitable for a crystallized glass in which a crystal phase is dispersed in a vitreous substance. Further, the crystal phase in the crystallized glass may scatter light and thereby may degrade performance as the optical element. These problems are not found in the amorphous glass.

According to the present exemplary embodiment, the method of melting a raw material mainly using the crucible has been illustrated as an example of the method of manufacturing the optical glass. However, it is possible to use a quartz tube that is opened at both ends thereof, as the melting container.

Specifically, the tube made of quartz or the like is obliquely fixed in the glass melting furnace. An opening is formed in a bottom of the glass melting furnace to be at a position corresponding to the lower part of the open end of the lower position side of the tube. The raw material (batch raw material or cullet) is introduced into the tube from the open end of the higher position side of the tube, and then is melted (or dissolved) in the tube to produce a molten substance. The molten substance slowly flows in the tube and flows out from the opening side of the lower position side of the tube.

For example, in the case of using the tube or the like in the rough melt step, a discharging substance passes through the opening formed in the bottom of the furnace and then is sequentially dropped into water in a water vessel that is previously arranged under the opening formed in the bottom of the glass melting furnace to produce the cullet.

Although the raw material is melted using the tube made of quartz or the like in the above-described method, a crucible made of quartz or the like may be used instead of the tube. First, the raw material is put into the crucible made of quartz or the like, and then is heated and melted to produce a molten substance. Subsequently, the molten substance is cast in the water, or is discharged to a cooled heat-resistant plate. Thus, the cullet may be produced.

Imaging Lens

The present exemplary embodiment provides an imaging lens having a barrel and a plurality of single lenses arranged in the barrel, at least one of the plurality of single lenses being a single lens made of the above-described optical glass.

Each of the single lenses is arranged at a position determined by an optical design, in the barrel of the imaging lens. For example, the plurality of single lenses constitutes a plurality of lens groups that includes one single lens or two or more single lenses. By varying distances between the respective lens groups, a zoom lens may be provided.

For example, a high-dispersion glass having an Abbe number (vd) of less than 23 is processed into a concave meniscus lens, is cemented with a convex meniscus lens made of an optical glass that is lower in dispersion than the high-dispersion glass, and is mounted to the imaging lens as a cemented lens constituting a first lens group that is at a position closest to the object side.

The single lenses are manufactured, respectively, using the optical glass according to the present exemplary embodiment and the optical glass that has the Abbe number (vd) of 23 or more and is high in transmittance for blue, and then are installed in the barrel. Thus, the color contribution index of the entire imaging lens may fall within the recommended permissible range that is established by the CCI standard.

Such an imaging lens is preferably applied to an interchangeable lens for a single-lens reflex camera or the like, a lens for a security camera and the like.

EXAMPLES

Hereinafter, although the present invention will be described in more detail with reference to examples, the present invention is not limited to the examples.

Example 1

[Preparation of Batch Raw Material]

First, when the optical glass having desired properties is manufactured, phosphoric acid, barium metaphosphate, titanium oxide, niobium oxide, boric acid, barium carbonate, sodium carbonate and potassium carbonate were prepared, respectively, as the raw materials of the glass. Next, the raw materials were appropriately selected, weighed and thoroughly mixed to prepare batch raw materials I and II so that the final composition of the resulting optical glass has oxide compositions I and II shown in Table 1.

TABLE 1

| glass component | oxide composition (mol %) | |
| --- | --- | --- |
|  | I | II |
| $P_2O_5$ | 23.6 | 25.7 |
| $TiO_2$ | 11.8 | 26.7 |
| $Nb_2O_5$ | 29.3 | 26.3 |
| $WO_3$ | — | — |
| $Bi_2O_3$ | — | — |
| $B_2O_3$ | 6.2 | 3.8 |
| BaO | 22.1 | 1.5 |

TABLE 1-continued

| glass component | oxide composition (mol %) | |
| --- | --- | --- |
|  | I | II |
| $Na_2O$ | — | 10 |
| $K_2O$ | 7 | 6 |
| $SiO_2$ | — | — |
| HR | 41.2 | 53 |

[Preparation of Cullet and Blended Cullet (Rough Melt Step)]

The blended batch raw materials I and II were used as the glass raw material of each optical glass. The glass raw material was put into the quartz crucible and was melted in the air atmosphere at 900 to 1350 degrees Celsius to obtain the molten substance. The molten substance obtained in this way was dropped into the water to obtain the cullet.

The cullet taken out from the water was dried, and some of the cullet was sampled to measure the refractive index, the cullet was put into the platinum crucible to be melted, and the obtained glass melt was clarified, homogenized and then poured into the mold to be molded. This glass was kept around the glass transition temperature, and then cooled down at the cooling rate of −30 degrees Celsius/hr. The refractive index (nd) of a sample for measuring the refractive index, which was obtained in this way, was measured by a refractive-index measurement method that was set by Japan Optical Glass Industry Society Standard.

Next, the cullet was blended to have a desired refractive index depending on the measured refractive index (nd), so that the blended cullet for manufacturing the optical glass was obtained.

[Manufacture of Optical Glass (Remelt Step)]

Next, the blended cullet was put into the platinum crucible (melting container), and the blended cullet in the platinum crucible was heated and melted at a temperature ranging from 800 to 1350 degrees Celsius to produce the molten glass (Melting Step).

Thereafter, the temperature of the crucible was raised to the clarifying temperature (900 to 1450 degrees Celsius) and then the glass was clarified (clarifying step). Subsequently, the temperature of the crucible was lowered to the homogenization temperature, and the glass was stirred by the stirring instrument to be homogenized (Homogenization Step).

Further, a volume in the melting furnace (a volume of space for accommodating the crucible in the furnace made of the refractory material), and a retention time (time from when the cullet was put into the platinum melting container to when the molten glass was discharged out from the melting container) of the molten substance in the melting furnace are shown in Table 2.

Further, when the melting step, the clarifying step, and the homogenization step are performed, the treatment (ia) of adding the water vapor to the melting atmosphere was carried out.

Specifically, the platinum pipe was inserted from an outside of the melting furnace into the platinum crucible placed in the furnace, and water vapor ($H_2O$ 100 vol %) was supplied through this platinum pipe into the space defined in the platinum crucible. As such, the water vapor was added to the melting atmosphere by adding the water vapor to the air. A flow rate of the supplied water vapor is shown in Table 2.

Further, the flow rate of the water vapor shown in Table 2 is a value that is converted into a flow rate at ambient temperature and atmospheric pressure, and the unit of the flow rate is liter/min.

TABLE 2

| sample No. | oxide composition | volume (liter) | retention time (hour) | flow rate of water vapor added to atmosphere (liter/min) |
|---|---|---|---|---|
| 1 | I | 40 | 5.5 | 300 |
| 2 | II | 40 | 4.8 | 320 |

The melting glass homogenized in this way was discharged out from the glass discharge pipe made of platinum and mounted to the bottom of the crucible, in the air atmosphere (discharging step), and was poured into the mold placed under the discharge pipe, thus molding a long glass block (150 mm in width×10 mm in thickness) (molding step).

Thereafter, the temperature of the glass block was raised at the rate of +100 degrees Celsius/hr in the air atmosphere, was maintained around the glass transition temperature for 1.5 to 8 hours, and was lowered at the rate of −10 degrees Celsius/hr (annealing step), and the deformation of the glass block was removed, so that two kinds of optical glass samples, that is, sample 1 having the oxide composition I and sample 2 having the oxide composition II were obtained.

[Evaluation of Optical Glass]

Various physical properties of the obtained optical glass samples (samples 1 and 2) were measured and evaluated as follows.

[1] Glass Composition

A proper amount of optical glass sample was taken and treated by acid and alkali. The content of each component of the sample was determined and measured using inductively coupled plasma mass spectrometry (ICP-MS method) and ion chromatography. Thereby, it was confirmed that the samples corresponded to the oxide compositions I and II.

[2] Refractive Index nd, Abbe Number νd and Glass Transition Temperature Tg

The melting glass, which has been subjected to the homogenization step when the optical glass sample was manufactured, was poured into the mold to be molded, was kept around the glass transition temperature, and then was cooled down at the cooling rate of −10 degrees Celsius/hr, so that a measuring sample was prepared. The refractive indexes nd, ng, nF and nc of the obtained measuring sample were measured by the refractive-index measurement method that was set by Japan Optical Glass Industry Society Standard. Further, the Abbe number (νd) was calculated from the measured values of the refractive indexes.

Next, the optical glass sample was processed to prepare a cylindrical measuring sample (5 mm in diameter and 20 mm in height). For the obtained measuring sample, the glass transition temperature (Tg) was measured under the condition that a heating rate was +10 degrees Celsius/min, using a thermomechanical analysis apparatus (TMA).

Since these characteristic values were due to the glass composition, it was confirmed that the optical glass sample adopting the same batch raw material as the glass raw material substantially had the same values. The results are shown in Table 3.

TABLE 3

| | oxide composition | |
|---|---|---|
| | I | II |
| refractive index nd | 1.923 | 1.946 |
| Abbe number νd | 20.88 | 17.98 |
| glass transition point Tg (° C.) | 666 | 637 |

[3] βOH

The optical glass sample was processed to prepare a plate-shaped glass sample with the thickness of 1 mm that was optically polished such that both sides thereof were parallel to each other or were flat. Light was vertically incident on the polishing surface of the plate-shaped glass sample, so that the external transmittance A in the wavelength of 2500 nm and the external transmittance B in the wavelength of 2900 nm were measured, respectively, using the spectrophotometer, and βOH was calculated by the following Equation (7).

$$\beta OH = -[\ln(B/A)]/t \quad (7)$$

In the above Equation (7), ln represents the natural logarithm, and the thickness (t) corresponds to a distance between the two planes. Further, the external transmittance includes a reflection loss on the surface of the glass sample, and is a ratio (intensity of transmitted light/intensity of incident light) of the intensity of transmitted light to the intensity of light incident on the glass sample. The higher βOH means that a larger amount of water is contained in the glass. The results are shown in Table 6.

[4] Spectral Transmittance and Color Contribution Index

The optical glass sample was heated at the rate of +100 degrees Celsius/hr in the air atmosphere, was held at a predetermined hold temperature for 100 hours, and was cooled at the rate of −30 degrees Celsius/hr to be thermally treated. Further, since the hold temperature varied depending on the composition, the hold temperature adopted temperature shown in Table 4 depending on the oxide composition of each optical glass sample.

TABLE 4

| | oxide composition | |
|---|---|---|
| | I | II |
| hold temperature (° C.) | 650 | 630 |

The optical glass sample that has been subjected to the thermal treatment was processed to prepare a plate-shaped glass sample with the thickness of 10 mm that was optically polished such that both sides thereof were parallel to each other or were flat. For the plate-shaped glass sample obtained in this manner, the external transmittance (spectral transmittance) was measured in the wavelength of 370 nm to 680 nm using the spectrophotometer. Further, the method of measuring the spectral transmittance conforms to a method established by an annex of the CCI standard.

From the spectral transmittance, the color contribution index of ISO/CCI(B), ISO/CCI(G) and ISO/CCI(R) was calculated for blue (B), green (G) and red (R), respectively, by the calculation method established by the CCI standard.

For the spectral transmittance obtained by the measurement, the relative spectral transmittance, and the color contribution index of ISO/CCI(B), ISO/CCI(G) and ISO/CCI(R), the measurement results and the calculation results of the sample 1 are shown in Table 5, and the measurement results and the calculation results of the sample 2 are shown in Table 6.

TABLE 5

| λ (nm) | $W_B$ | $W_G$ | $W_R$ | spectral transmittance (%) | relative spectral transmittance $\tau(\lambda)$ | $W_B \times \tau(\lambda)$ | $W_G \times \tau(\lambda)$ | $W_R \times \tau(\lambda)$ |
|---|---|---|---|---|---|---|---|---|
| 370 | 1 | | | 0.000 | 0.00 | 0.00 | 0.00 | 0.00 |
| 380 | 1 | | | 4.254 | 0.04 | 0.04 | 0.00 | 0.00 |
| 390 | 3 | | | 34.557 | 0.35 | 1.04 | 0.00 | 0.00 |
| 400 | 7 | | | 69.539 | 0.70 | 4.90 | 0.00 | 0.00 |
| 410 | 10 | | | 85.428 | 0.86 | 8.61 | 0.00 | 0.00 |
| 420 | 12 | | | 91.317 | 0.92 | 11.04 | 0.00 | 0.00 |
| 430 | 12 | | | 93.814 | 0.95 | 11.34 | 0.00 | 0.00 |
| 440 | 13 | | | 95.227 | 0.96 | 12.47 | 0.00 | 0.00 |
| 450 | 13 | | | 95.982 | 0.97 | 12.57 | 0.00 | 0.00 |
| 460 | 12 | | | 96.554 | 0.97 | 11.67 | 0.00 | 0.00 |
| 470 | 8 | 1 | | 96.973 | 0.98 | 7.81 | 0.98 | 0.00 |
| 480 | 4 | 1 | | 97.399 | 0.98 | 3.92 | 0.98 | 0.00 |
| 490 | 2 | 1 | | 97.992 | 0.99 | 1.97 | 0.99 | 0.00 |
| 500 | 1 | 2 | | 98.151 | 0.99 | 0.99 | 1.98 | 0.00 |
| 510 | 1 | 4 | | 98.402 | 0.99 | 0.99 | 3.97 | 0.00 |
| 520 | | 5 | | 98.633 | 0.99 | 0.00 | 4.97 | 0.00 |
| 530 | | 8 | | 98.725 | 0.99 | 0.00 | 7.96 | 0.00 |
| 540 | | 15 | | 98.996 | 1.00 | 0.00 | 14.96 | 0.00 |
| 550 | | 25 | 1 | 98.980 | 1.00 | 0.00 | 24.93 | 1.00 |
| 560 | | 13 | 1 | 99.162 | 1.00 | 0.00 | 12.99 | 1.00 |
| 570 | | 13 | 1 | 99.096 | 1.00 | 0.00 | 12.98 | 1.00 |
| 580 | | 9 | 2 | 99.226 | 1.00 | 0.00 | 9.00 | 2.00 |
| 590 | | 2 | 3 | 99.174 | 1.00 | 0.00 | 2.00 | 3.00 |
| 600 | | 1 | 4 | 99.221 | 1.00 | 0.00 | 1.00 | 4.00 |
| 610 | | | 6 | 99.213 | 1.00 | 0.00 | 0.00 | 6.00 |
| 620 | | | 8 | 99.188 | 1.00 | 0.00 | 0.00 | 7.99 |
| 630 | | | 12 | 99.223 | 1.00 | 0.00 | 0.00 | 11.99 |
| 640 | | | 19 | 99.218 | 1.00 | 0.00 | 0.00 | 18.99 |
| 650 | | | 22 | 99.176 | 1.00 | 0.00 | 0.00 | 21.98 |
| 660 | | | 16 | 99.227 | 1.00 | 0.00 | 0.00 | 15.99 |
| 670 | | | 4 | 99.188 | 1.00 | 0.00 | 0.00 | 4.00 |
| 680 | | | 1 | 99.269 | 1.00 | 0.00 | 0.00 | 1.00 |
| | | | | $R_i = \Sigma(WI \times \tau(\lambda))$ | | 89.36 | 99.69 | 99.94 |
| | | | | $\log_{10}R_i$ | | 1.951 | 1.999 | 2.000 |
| | | | | $\log_{10}R_i - (\log_{10}R_i \text{minimum value})$ | | 0.00 | 0.05 | 0.05 |
| | | | | ISO/CCI | | 0.0 (B) | 4.8 (G) | 4.9 (R) |

(note)
(B) of ISO/CCI denotes color contribution index for blue,
(G) denotes color contribution index for green, and
(R) denotes color contribution index for red.

TABLE 6

| λ (nm) | $W_B$ | $W_G$ | $W_R$ | spectral transmittance (%) | relative spectral transmittance $\tau(\lambda)$ | $W_B \times \tau(\lambda)$ | $W_G \times \tau(\lambda)$ | $W_R \times \tau(\lambda)$ |
|---|---|---|---|---|---|---|---|---|
| 370 | 1 | | | 0.000 | 0.00 | 0.00 | 0.00 | 0.00 |
| 380 | 1 | | | 0.015 | 0.00 | 0.00 | 0.00 | 0.00 |
| 390 | 3 | | | 4.953 | 0.05 | 0.15 | 0.00 | 0.00 |
| 400 | 7 | | | 35.502 | 0.36 | 2.49 | 0.00 | 0.00 |
| 410 | 10 | | | 69.757 | 0.70 | 6.98 | 0.00 | 0.00 |
| 420 | 12 | | | 85.627 | 0.86 | 10.29 | 0.00 | 0.00 |
| 430 | 12 | | | 91.504 | 0.92 | 10.99 | 0.00 | 0.00 |
| 440 | 13 | | | 93.886 | 0.94 | 12.22 | 0.00 | 0.00 |
| 450 | 13 | | | 95.236 | 0.95 | 12.40 | 0.00 | 0.00 |
| 460 | 12 | | | 96.129 | 0.96 | 11.55 | 0.00 | 0.00 |
| 470 | 8 | 1 | | 96.737 | 0.97 | 7.75 | 0.97 | 0.00 |
| 480 | 4 | 1 | | 97.256 | 0.97 | 3.90 | 0.97 | 0.00 |
| 490 | 2 | 1 | | 97.911 | 0.98 | 1.96 | 0.98 | 0.00 |
| 500 | 1 | 2 | | 98.276 | 0.98 | 0.98 | 1.97 | 0.00 |
| 510 | 1 | 4 | | 98.483 | 0.99 | 0.99 | 3.94 | 0.00 |
| 520 | | 5 | | 98.833 | 0.99 | 0.00 | 4.95 | 0.00 |
| 530 | | 8 | | 98.948 | 0.99 | 0.00 | 7.93 | 0.00 |
| 540 | | 15 | | 99.069 | 0.99 | 0.00 | 14.88 | 0.00 |
| 550 | | 25 | 1 | 99.203 | 0.99 | 0.00 | 24.83 | 0.99 |
| 560 | | 13 | 1 | 99.387 | 1.00 | 0.00 | 12.94 | 1.00 |
| 570 | | 13 | 1 | 99.411 | 1.00 | 0.00 | 12.94 | 1.00 |
| 580 | | 9 | 2 | 99.627 | 1.00 | 0.00 | 8.98 | 2.00 |
| 590 | | 2 | 3 | 99.569 | 1.00 | 0.00 | 1.99 | 2.99 |
| 600 | | 1 | 4 | 99.656 | 1.00 | 0.00 | 1.00 | 3.99 |
| 610 | | | 6 | 99.647 | 1.00 | 0.00 | 0.00 | 5.99 |

TABLE 6-continued

| λ (nm) | $W_B$ | $W_G$ | $W_R$ | spectral transmittance (%) | relative spectral transmittance $\tau(\lambda)$ | $W_B \times \tau(\lambda)$ | $W_G \times \tau(\lambda)$ | $W_R \times \tau(\lambda)$ |
|---|---|---|---|---|---|---|---|---|
| 620 | | | 8 | 99.746 | 1.00 | 0.00 | 0.00 | 7.99 |
| 630 | | | 12 | 99.591 | 1.00 | 0.00 | 0.00 | 11.97 |
| 640 | | | 19 | 99.829 | 1.00 | 0.00 | 0.00 | 18.99 |
| 650 | | | 22 | 99.752 | 1.00 | 0.00 | 0.00 | 21.97 |
| 660 | | | 16 | 99.748 | 1.00 | 0.00 | 0.00 | 15.98 |
| 670 | | | 4 | 99.869 | 1.00 | 0.00 | 0.00 | 4.00 |
| 680 | | | 1 | 99.680 | 1.00 | 0.00 | 0.00 | 1.00 |
| | | | | $R_i = \Sigma(WI \times \tau(\lambda))$ | | 82.65 | 99.27 | 99.86 |
| | | | | $\log_{10} R_i$ | | 1.917 | 1.997 | 1.999 |
| | | | $\log_{10} R_i - (\log_{10} R_i$ minimum value$)$ | | | 0.00 | 0.08 | 0.08 |
| | | | | ISO/CCI | | 0 (B) | 8.0 (G) | 8.2 (R) |

(note)
(B) of ISO/CCI denotes color contribution index for blue,
(G) denotes color contribution index for green, and
(R) denotes color contribution index for red.

[5] Pt Content

A proper amount of optical glass sample was taken and was subjected to alkali fusion to separate Pt therefrom. Subsequently, the content of Pt in the glass was determined by the ICP-MS method. The results are shown in Table 7. The contents of the noble metal other than Pt were zero.

[6] Defoaming 40 cc of the molten glass (glass melt) was taken before the clarifying step was initiated when the optical glass sample was manufactured. This glass melt was clarified in another platinum crucible in the air for a certain period of time, and was cooled in the platinum crucible to be solidified. In this process, the coloring was sufficiently reduced to allow the number of bubbles contained in the glass to be counted. Next, the solidified glass was taken out from the platinum crucible.

For the measuring sample obtained in this manner, the number of bubbles contained in the glass was counted by magnifying (100×) and observing an interior of the glass using an optical microscope (20 to 100× magnifications). The same observation was performed on the respective measuring samples having different clarifying times. The clarifying time of each measuring sample when the number of the bubbles remaining in the glass became 100 bubbles/kg or less was evaluated as a bubble removal time. The shorter the bubble removal time is, the more excellent the clarifying property is. The results are shown in Table 7.

TABLE 7

| sample No. | oxide composition | βOH (mm$^{-1}$) | Pt (ppm) | defoaming (min) |
|---|---|---|---|---|
| 1 | I | 1.14 | 0.61 | 77 |
| 2 | II | 1.31 | 0.66 | 71 |

As shown in Table 7, according to the present example, it is possible to effectively prevent Pt of the melting container from being dissolved into the glass. Thus, it was confirmed that the content of the noble metal in the obtained optical glass sample was reduced. Further, it is possible to increase the water content of the obtained optical glass sample. When such an optical glass sample was thermally treated in an oxidizing atmosphere, the transmittance was dramatically improved, thus allowing the color contribution index to be included in the recommended permissible range established by the CCI standard.

COMPARATIVE EXAMPLE

Except that all of the melting step, the clarifying step and the homogenization step are performed under the air atmosphere without supplying water vapor in the state where the melting container was not covered by a lid to be open, the comparative example remains the same as Example 1 to prepare the optical glass sample (sample 1') having the oxide composition I and the optical glass sample (sample 2') having the oxide composition II. The spectral transmittance, βOH, the Pt content, and the defoaming time of each of the samples 1' and 2' were measured and evaluated in the same method as Example 1.

In the sample 1' with the thickness of 10 mm, the spectral transmittance, the relative spectral transmittance, and the contribution index of ISO/CCI(B), ISO/CCI(G) and ISO/CCI(R) are shown in Table 8.

In the sample 2' with the thickness of 10 mm, the spectral transmittance, the relative spectral transmittance, and the contribution index of ISO/CCI(B), ISO/CCI(G) and ISO/CCI(R) are shown in Table 9.

βOH, the Pt content, and the defoaming time of each of the samples 1' and 2' are shown in Table 10.

TABLE 8

| λ (nm) | $W_B$ | $W_G$ | $W_R$ | spectral transmittance (%) | relative spectral transmittance $\tau(\lambda)$ | $W_B \times \tau(\lambda)$ | $W_G \times \tau(\lambda)$ | $W_R \times \tau(\lambda)$ |
|---|---|---|---|---|---|---|---|---|
| 370 | 1 | | | 0.000 | 0.00 | 0.00 | 0.00 | 0.00 |
| 380 | 1 | | | 2.621 | 0.03 | 0.03 | 0.00 | 0.00 |
| 390 | 3 | | | 14.870 | 0.15 | 0.45 | 0.00 | 0.00 |
| 400 | 7 | | | 37.798 | 0.38 | 2.67 | 0.00 | 0.00 |
| 410 | 10 | | | 59.339 | 0.60 | 5.98 | 0.00 | 0.00 |
| 420 | 12 | | | 73.372 | 0.74 | 8.87 | 0.00 | 0.00 |

TABLE 8-continued

| λ (nm) | $W_B$ | $W_G$ | $W_R$ | spectral transmittance (%) | relative spectral transmittance τ(λ) | $W_B × τ(λ)$ | $W_G × τ(λ)$ | $W_R × τ(λ)$ |
|---|---|---|---|---|---|---|---|---|
| 430 | 12 | | | 81.624 | 0.82 | 9.87 | 0.00 | 0.00 |
| 440 | 13 | | | 86.558 | 0.87 | 11.34 | 0.00 | 0.00 |
| 450 | 13 | | | 89.411 | 0.90 | 11.71 | 0.00 | 0.00 |
| 460 | 12 | | | 91.375 | 0.92 | 11.05 | 0.00 | 0.00 |
| 470 | 8 | 1 | | 92.739 | 0.93 | 7.48 | 0.93 | 0.00 |
| 480 | 4 | 1 | | 93.712 | 0.94 | 3.78 | 0.94 | 0.00 |
| 490 | 2 | 1 | | 95.221 | 0.96 | 1.92 | 0.96 | 0.00 |
| 500 | 1 | 2 | | 95.836 | 0.97 | 0.97 | 1.93 | 0.00 |
| 510 | 1 | 4 | | 96.348 | 0.97 | 0.97 | 3.88 | 0.00 |
| 520 | | 5 | | 96.790 | 0.98 | 0.00 | 4.88 | 0.00 |
| 530 | | 8 | | 97.226 | 0.98 | 0.00 | 7.84 | 0.00 |
| 540 | | 15 | | 97.536 | 0.98 | 0.00 | 14.74 | 0.00 |
| 550 | | 25 | 1 | 97.855 | 0.99 | 0.00 | 24.65 | 0.99 |
| 560 | | 13 | 1 | 98.080 | 0.99 | 0.00 | 12.85 | 0.99 |
| 570 | | 13 | 1 | 98.277 | 0.99 | 0.00 | 12.87 | 0.99 |
| 580 | | 9 | 2 | 98.415 | 0.99 | 0.00 | 8.92 | 1.98 |
| 590 | | 2 | 3 | 98.514 | 0.99 | 0.00 | 1.99 | 2.98 |
| 600 | | 1 | 4 | 98.694 | 0.99 | 0.00 | 0.99 | 3.98 |
| 610 | | | 6 | 98.823 | 1.00 | 0.00 | 0.00 | 5.97 |
| 620 | | | 8 | 98.839 | 1.00 | 0.00 | 0.00 | 7.97 |
| 630 | | | 12 | 98.879 | 1.00 | 0.00 | 0.00 | 11.96 |
| 640 | | | 19 | 98.975 | 1.00 | 0.00 | 0.00 | 18.95 |
| 650 | | | 22 | 99.021 | 1.00 | 0.00 | 0.00 | 21.95 |
| 660 | | | 16 | 99.099 | 1.00 | 0.00 | 0.00 | 15.98 |
| 670 | | | 4 | 99.116 | 1.00 | 0.00 | 0.00 | 3.99 |
| 680 | | | 1 | 99.244 | 1.00 | 0.00 | 0.00 | 1.00 |
| | | | $R_i = Σ(WI × τ(λ))$ | | | 77.09 | 98.37 | 99.68 |
| | | | $log_{10}R_i$ | | | 1.887 | 1.993 | 1.999 |
| | | | $log_{10}R_i - (log_{10}R_i minimum value)$ | | | 0.00 | 0.11 | 0.11 |
| | | | ISO/CCI | | | 0 (B) | 10.6 (G) | 11.2 (R) |

(note)
(B) of ISO/CCI denotes color contribution index for blue,
(G) denotes color contribution index for green, and
(R) denotes color contribution index for red.

TABLE 9

| λ (nm) | $W_B$ | $W_G$ | $W_R$ | spectral transmittance (%) | relative spectral transmittance τ(λ) | $W_B × τ(λ)$ | $W_G × τ(λ)$ | $W_R × τ(λ)$ |
|---|---|---|---|---|---|---|---|---|
| 370 | 1 | | | 0.000 | 0.00 | 0.00 | 0.00 | 0.00 |
| 380 | 1 | | | 0.000 | 0.00 | 0.00 | 0.00 | 0.00 |
| 390 | 3 | | | 1.488 | 0.02 | 0.05 | 0.00 | 0.00 |
| 400 | 7 | | | 9.947 | 0.10 | 0.70 | 0.00 | 0.00 |
| 410 | 10 | | | 28.319 | 0.29 | 2.87 | 0.00 | 0.00 |
| 420 | 12 | | | 48.984 | 0.50 | 5.95 | 0.00 | 0.00 |
| 430 | 12 | | | 64.642 | 0.65 | 7.85 | 0.00 | 0.00 |
| 440 | 13 | | | 74.800 | 0.76 | 9.84 | 0.00 | 0.00 |
| 450 | 13 | | | 81.124 | 0.82 | 10.67 | 0.00 | 0.00 |
| 460 | 12 | | | 85.171 | 0.86 | 10.34 | 0.00 | 0.00 |
| 470 | 8 | 1 | | 87.867 | 0.89 | 7.11 | 0.89 | 0.00 |
| 480 | 4 | 1 | | 89.805 | 0.91 | 3.64 | 0.91 | 0.00 |
| 490 | 2 | 1 | | 92.490 | 0.94 | 1.87 | 0.94 | 0.00 |
| 500 | 1 | 2 | | 93.481 | 0.95 | 0.95 | 1.89 | 0.00 |
| 510 | 1 | 4 | | 94.353 | 0.95 | 0.95 | 3.82 | 0.00 |
| 520 | | 5 | | 95.151 | 0.96 | 0.00 | 4.82 | 0.00 |
| 530 | | 8 | | 95.839 | 0.97 | 0.00 | 7.76 | 0.00 |
| 540 | | 15 | | 96.462 | 0.98 | 0.00 | 14.64 | 0.00 |
| 550 | | 25 | 1 | 96.824 | 0.98 | 0.00 | 24.50 | 0.98 |
| 560 | | 13 | 1 | 97.189 | 0.98 | 0.00 | 12.79 | 0.98 |
| 570 | | 13 | 1 | 97.589 | 0.99 | 0.00 | 12.84 | 0.99 |
| 580 | | 9 | 2 | 97.706 | 0.99 | 0.00 | 8.90 | 1.98 |
| 590 | | 2 | 3 | 97.854 | 0.99 | 0.00 | 1.98 | 2.97 |
| 600 | | 1 | 4 | 98.038 | 0.99 | 0.00 | 0.99 | 3.97 |
| 610 | | | 6 | 98.268 | 0.99 | 0.00 | 0.00 | 5.97 |
| 620 | | | 8 | 98.340 | 1.00 | 0.00 | 0.00 | 7.96 |
| 630 | | | 12 | 98.322 | 1.00 | 0.00 | 0.00 | 11.94 |
| 640 | | | 19 | 98.393 | 1.00 | 0.00 | 0.00 | 18.92 |

TABLE 9-continued

| λ (nm) | $W_B$ | $W_G$ | $W_R$ | spectral transmittance (%) | relative spectral transmittance τ(λ) | $W_B × τ(λ)$ | $W_G × τ(λ)$ | $W_R × τ(λ)$ |
|---|---|---|---|---|---|---|---|---|
| 650 | | | 22 | 98.535 | 1.00 | 0.00 | 0.00 | 21.94 |
| 660 | | | 16 | 98.643 | 1.00 | 0.00 | 0.00 | 15.97 |
| 670 | | | 4 | 98.728 | 1.00 | 0.00 | 0.00 | 4.00 |
| 680 | | | 1 | 98.801 | 1.00 | 0.00 | 0.00 | 1.00 |
| $R_i = Σ(WI × τ(λ))$ | | | | | | 62.79 | 97.67 | 99.57 |
| $\log_{10}R_i$ | | | | | | 1.798 | 1.990 | 1.998 |
| $\log_{10}R_i − (\log_{10}R_i\text{minimum value})$ | | | | | | 0.00 | 0.19 | 0.20 |
| ISO/CCI | | | | | | 0 (B) | 19.2 (G) | 20 (R) |

(note)
(B) of ISO/CCI denotes color contribution index for blue,
(G) denotes color contribution index for green, and
(R) denotes color contribution index for red.

TABLE 10

| sample No. | oxide composition | βOH (mm$^{-1}$) | Pt (ppm) | defoaming (min) |
|---|---|---|---|---|
| 1' | I | 0.54 | 2.0 | 83 |
| 2' | II | 0.25 | 2.8 | 83 |

In the sample 1' with the thickness of 10 mm, ISO/CCI(B) is 0, ISO/CCI(G) is 10.6, and ISO/CCI(R) is 11.2. They are out of the recommended permissible range of the color contribution index established by the CCI standard.

In the sample 2' with the thickness of 10 mm, ISO/CCI(B) is 0, ISO/CCI(G) is 19.2, and ISO/CCI(R) is 20.0. They are out of the recommended permissible range of the color contribution index established by the CCI standard.

Summary of Example 1 and Comparative Example

The color contribution index of the samples 1 and 2 when they are made in the thicknesses of 10 mm, 5 mm, 2 mm and 1.5 mm is shown in Table 11.

The color contribution index of the samples 1' and 2' when they are made in the thicknesses of 10 mm, 5 mm, 2 mm and 1.5 mm are shown in Table 11.

TABLE 11

| | thickness 10 mm | | | thickness 5 mm | | | thickness 2 mm | | | thickness 1.5 mm | | |
|---|---|---|---|---|---|---|---|---|---|---|---|---|
| sample No. | CCI(B) | CCI(G) | CCI(R) | CCI(B) | CCI(G) | CCI(R) | CCI(B) | CCI(G) | CCI(R) | CCI(B) | CCI(G) | CCI(R) |
| sample 1 | 0.0 | 4.8 | 4.9 | 0.0 | 2.9 | 2.9 | 0.0 | 1.5 | 1.5 | 0.0 | 1.2 | 1.3 |
| semple 1' | 0.0 | 10.6 | 11.2 | — | — | — | — | — | — | — | — | — |
| sample 2 | 0.0 | 8.0 | 8.2 | 0.0 | 5.1 | 5.2 | 0.0 | 2.7 | 2.8 | 0.0 | 2.2 | 2.3 |
| sample 2' | 0.0 | 19.2 | 20.0 | — | — | — | — | — | — | — | — | — |

(note)
CCI(B) denotes color contribution index for blue,
CCI(G) denotes color contribution index for green, and
CCI(R) denotes color contribution Index for red.

Example 2

The optical glass sample (sample 1) with the oxide composition I produced in Example 1 was employed as the glass material for press molding, the glass material was heated, softened, and then pressed using a pressing mold, so that a lens blank having a shape similar to the shape of the concave meniscus lens was molded.

The lens blank was annealed to reduce the deformation, and then was treated such that the refractive index (nd) and the Abbe number (vd) were identical with those described in Table 3.

Thereafter, the lens blank was ground and polished such that one main surface of the lens blank was formed into the optical polished surface (first surface) having the shape of a convex spherical surface with a curvature radius of 287.45 mm, and the other main surface of the lens blank was formed into the optical polished surface (second surface) having the shape of a concave spherical surface with a curvature radius of 119.14 mm. Thus, a concave meniscus lens was manufactured. The central thickness of the concave meniscus lens was 1.5 mm. Both the optical functional faces of the lens were coated with optical multilayer films having an anti-reflection function.

Example 3

The optical glass sample (sample 2) with the oxide composition II produced in Example 1 was employed as the glass material for press molding, the glass material was heated, softened, and then pressed using the pressing mold, so that a lens blank having a shape similar to the shape of the concave meniscus lens was molded.

The lens blank was annealed to reduce the deformation, and then was treated such that the refractive index (nd) and the Abbe number (vd) were identical with those described in Table 3.

Thereafter, the lens blank was ground and polished such that one main surface of the lens blank was formed into the optical polished surface (first surface) having the shape of a convex spherical surface with a curvature radius of 26.00 mm, and the other main surface of the lens blank was formed into the optical polished surface (second surface) having the shape of a concave spherical surface with a curvature radius of 18.81 mm. Thus, a concave meniscus lens was manufactured. The central thickness of the concave meniscus lens was 0.8 mm. Both the optical functional faces of the lens were coated with optical multilayer films having an anti-reflection function.

Example 4

A zoom lens with a focal length of 24 mm to 69 mm was manufactured using the concave meniscus made in Example 2.

The zoom lens includes four groups, that is, a positive first lens group, a negative second lens group, a positive third lens group, and a positive fourth lens group.

The concave meniscus lens is used on a side that is the closest to the object side (subject side) of the first lens group. The first lens group is composed of three lenses including the above-mentioned concave meniscus lens.

Other two lenses constituting the first lens group are a convex meniscus lens that is formed such that one optical functional face thereof is a convex spherical surface (third surface) having the curvature radius of 119.14 mm, the other optical functional face thereof is a concave spherical surface (fourth surface) having the curvature radius of 963.83 mm, and is made of an optical glass having a central thickness of 7.0 mm, a refractive index (nd) of 1.773, and an Abbe number (vd) of 49.62, and a convex meniscus lens that is formed such that one optical functional face thereof is a convex spherical surface (fifth surface) having the curvature radius of 64.75 mm, the other optical functional face thereof is a concave spherical surface (sixth surface) having the curvature radius of 158.53 mm, and is made of an optical glass having a central thickness of 7.0 mm, a refractive index (nd) of 1.729, and an Abbe number (vd) of 54.67.

Figure 2:
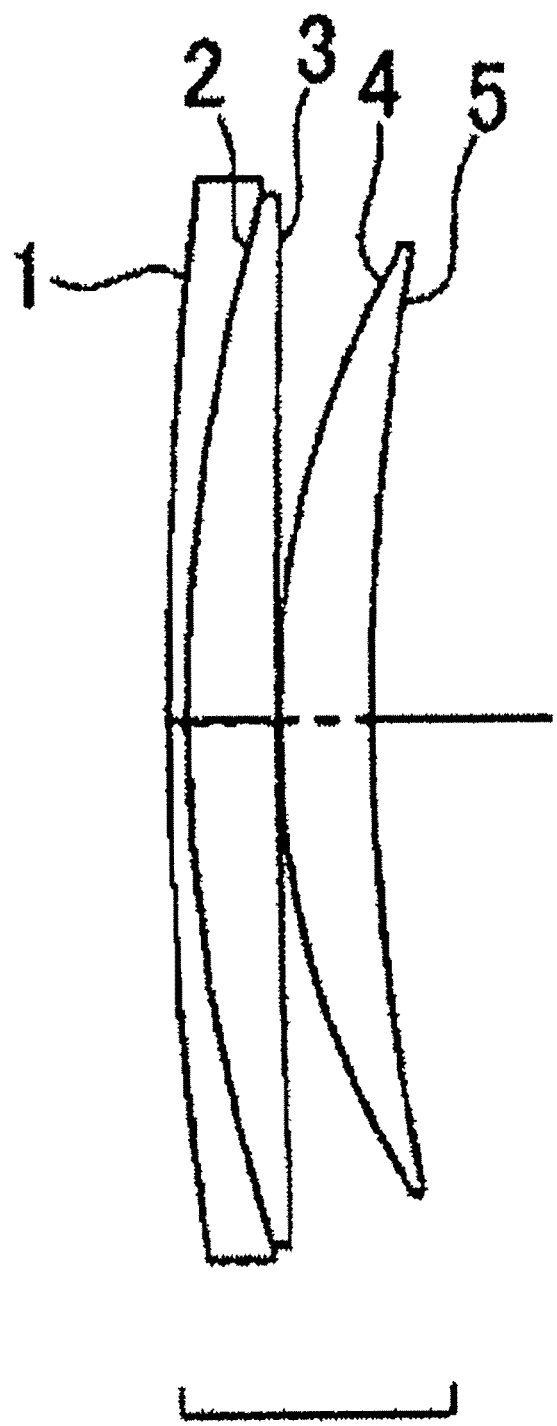
FIG. 2 is a sectional view including an optical axis of a first lens group of an imaging lens related to Example 4.

The second surface of the concave meniscus lens and the third surface of the convex meniscus lens are cemented together by a known method. Further, as shown in FIG. 2, the respective lenses are disposed such that the first surface 1, the second surface 2, the third surface 2, the fourth surface 3, the fifth surface 4 and the sixth surface 5 are arranged in this order from the object side to the image side, thus constituting the first lens group. The second surface 2 and the third surface 2 are cemented surfaces.

The distance between the fourth and fifth surfaces is set to be 0.2 mm. That is, the distance between the cemented lens placed on the object side and the convex meniscus lens having the fifth and sixth surfaces is 0.2 mm.

The first lens group obtained as such, the negative second lens group, the positive third lens group, and the positive fourth lens group were installed in the lens barrel to manufacture the zoom lens. The zoom lens has a zoom function by changing distances between the respective lens groups.

Further, all the lenses used in the second lens group, the third lens group, and the fourth lens group have the Abbe number (vd) of 23 or more, and rarely cause a reduction in transmittance for blue due to the reducing color or the like, as in the conventional lens made of the high-dispersion glass. Therefore, the color contribution index of the entire zoom lens is within the recommended permissible range established by the CCI standard.

Hence, the above-mentioned zoom lens is preferably used as an interchangeable lens of an imaging device such as a single-lens reflex camera.

Example 5

A zoom lens with a focal length of 5 mm to 34 mm was manufactured using the concave meniscus made in Example 3.

The zoom lens includes four groups, that is, a positive first lens group, a negative second lens group, a positive third lens group, and a positive fourth lens group.

The concave meniscus lens is used on a side that is the closest to the object side (subject side) of the first lens group. The first lens group is composed of two lenses including the above-mentioned concave meniscus lens.

The other lens constituting the first lens group is a convex meniscus lens that is formed such that one optical functional face thereof is a convex spherical surface (third surface) having the curvature radius of 18.81 mm, the other optical functional face thereof is a concave spherical surface (fourth surface) having the curvature radius of 191.91 mm, and is made of an optical glass having a central thickness of 3.5 mm, a refractive index (nd) of 1.816, and an Abbe number (vd) of 46.62.

Figure 3:
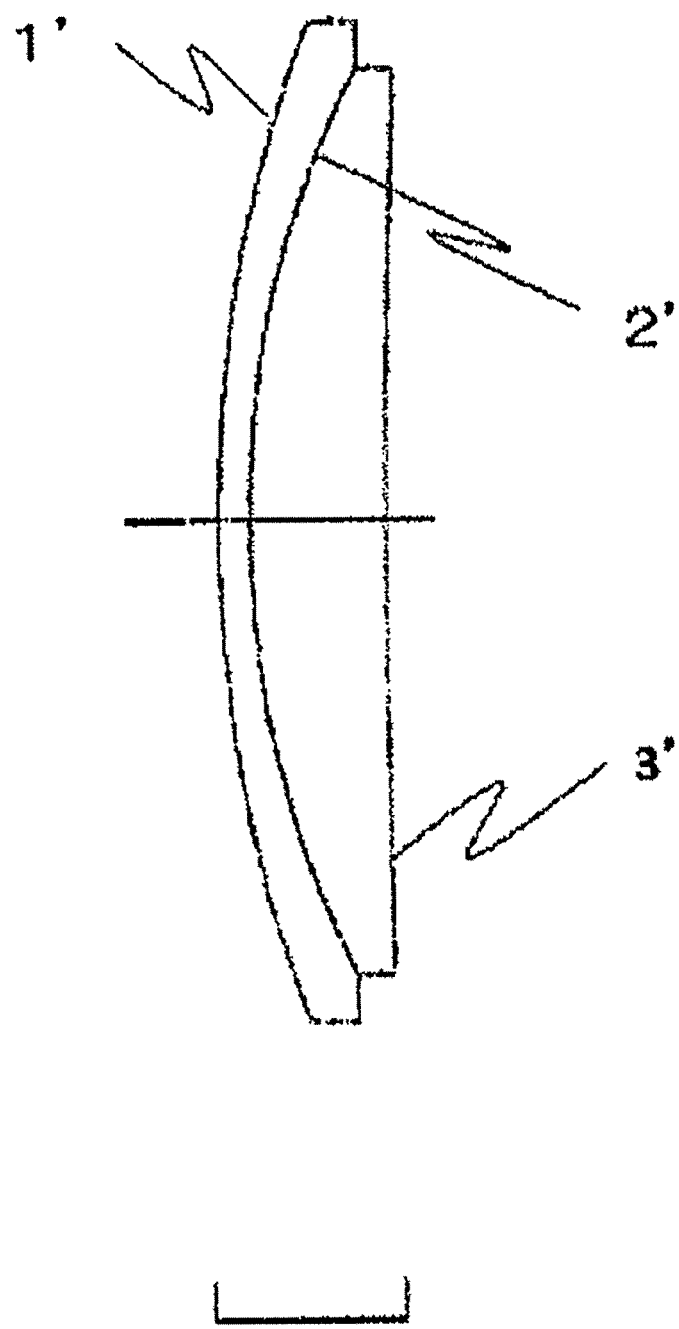
FIG. 3 is a sectional view including an optical axis of a first lens group of an imaging lens related to Example 5.

The second surface of the concave meniscus lens and the third surface of the convex meniscus lens are cemented together by a known method. FIG. 3 is a sectional view including an optical axis of a cemented lens manufactured in this way. The cemented lens forms the first lens group. The second surface 2' and the third surface 2' are cemented surfaces.

The first lens group, the second lens group, the third lens group, and the fourth lens group were installed in the lens barrel to manufacture the zoom lens. The zoom lens has a zoom function by changing distances between the respective lens groups.

Further, all the lenses used in the second lens group, the third lens group, and the fourth lens group have the Abbe number (vd) of 23 or more, and rarely cause a reduction in transmittance for blue due to the reducing color or the like, as in the conventional lens made of the high-dispersion glass. Therefore, the color contribution index of the entire zoom lens is within the recommended permissible range established by the CCI standard.

Hence, the above-mentioned zoom lens is preferably used as an interchangeable lens of an imaging device such as a single-lens reflex camera.

DESCRIPTION OF IMPORTANT PARTS

1 first surface of lens that is closest to object side in Example 4
2 second surface of lens that is closest to object side, and third surface of lens that is the second closest to object side in Example 4
3 fourth surface of lens that is the second closest to object side in Example 4
4 fifth surface of lens that is the third closest to object side in Example 4
5 sixth surface of lens that is the third closest to object side in Example 4
1' first surface of lens that is closest to object side in Example 5
2' second surface of lens that is closest to object side, and third surface of lens that is the second closest to object side in Example 5
3' fourth surface of lens that is the second closest to object side in Example 5

What is claimed is:
1. An optical glass that has an Abbe number (vd) of less than 23, a refractive index (nd) of 1.91 or more, a content of $Sb_2O_3$ being 0 ppm or more and less than 1000 ppm and a total content of $TiO_2$, $Nb_2O_5$, $WO_3$ and $Bi_2O_3$ being 37 mol % or more, in terms of oxides, wherein an ISO color contribution index (ISO/CCI) in terms of a flat plate with a thickness of 10 mm is 0 for blue (B), 9 or less for green (G), and 9 or less for red (R).

2. The optical glass according to claim 1, wherein a total content of $TiO_2$, $Nb_2O_5$, $WO_3$ and $Bi_2O_3$ is 38 mol % or more.

3. The optical glass according to claim 1, wherein a total content of $TiO_2$, $Nb_2O_5$, $WO_3$ and $Bi_2O_3$ is 39 mol % or more.

4. The optical glass according to claim 1, wherein a total content of $TiO_2$, $Nb_2O_5$, $WO_3$ and $Bi_2O_3$ is 40 mol % or more.

5. The optical glass according to claim 1, wherein the optical glass is a phosphate optical glass.

6. The optical glass according to claim 1, wherein the content of $Sb_2O_3$ is less than 900 ppm.

7. The optical glass according to claim 1, wherein the content of $Sb_2O_3$ is less than 800 ppm.

8. The optical glass according to claim 1, wherein a content of noble metal is 3.0 ppm or less.

9. The optical glass according to claim 1, wherein the value of βOH shown in below equation (7) is 0.1 $mm^{-1}$ or more, $$\beta OH = -[\ln(B/A)]/t \qquad (7)$$

wherein t represents a thickness (mm) of the glass used to measure the external transmittance, A represents an external transmittance (%) in the wavelength of 2500 nm when light is incident on the glass to be parallel to a thickness direction thereof, and B represents an external transmittance (%) in the wavelength of 2900 nm when light is incident on the glass to be parallel to the thickness direction thereof, and ln is a natural logarithm.

10. The optical glass according to claim 1, wherein the refractive index (nd) is 1.92 or more.

11. The optical glass according to claim 1, wherein the refractive index (nd) is 1.93 or more.

12. The optical glass according to claim 1, wherein the ISO color contribution index (ISO/CCI) in terms of a flat plate with a thickness of 10 mm is 8.8 or less for green (G).

13. The optical glass according to claim 1, wherein the ISO color contribution index (ISO/CCI) in terms of a flat plate with a thickness of 10 mm is 8.8 or less for red (R).

14. The optical glass according to claim 1, wherein the Abbe number (vd) is 20 or more and less than 23, and ISO/CCI in terms of a flat plate with a thickness of 10 mm is 7 or less for green (G), and 7 or less for red (R).

15. The optical glass according to claim 1, wherein the Abbe number (vd) is 20 or more and less than 23, and ISO/CCI in terms of a flat plate with a thickness of 10 mm is 6 or less for green (G), and 6 or less for red (R).

16. An optical element comprising an optical glass set forth in claim 1.

17. An imaging lens having a barrel and a plurality of single lenses arranged in the barrel, wherein at least one of the plurality of single lenses comprises an optical glass set forth in claim 1.

18. An optical glass that has an Abbe number (vd) of less than 23, a refractive index (nd) of 1.91 or more, a content of $Sb_2O_3$ being 0 ppm or more and less than 1000 ppm, wherein a total content of $TiO_2$, $Nb_2O_5$, $WO_3$ and $Bi_2O_3$ is 35 mol % or more, a content of $P_2O_5$ is 7 to 40 mol %, a content of $SiO_2$ is 0 mol % to 0.8×M (content [mol %] of $P_2O_5$), a content of $B_2O_3$ is 0 mol % to 0.9×M (content [mol %] of $P_2O_5$), a content of $TiO_2$ is 0-40 mol %, a content of $Nb_2O_5$ is 0-45 mol %, a content of $WO_3$ is 0 to 30 mol %, a content of $Bi_2O_3$ is 0 to 35 mol %, a total content of BaO, SrO, CaO, MgO and ZnO is 0 to 40 mol %, a content of BaO is 0 to 40 mol %, a total content of $Li_2O$, $Na_2O$ and $K_2O$ is 0 to 40 mol %, a content of $Al_2O_3$ is in the range of 0 to 12 mol %, a content of $ZrO_2$ is 0 to 16 mol %, a content of $GeO_2$ is 0 to 10 mol %, and a content of $TeO_2$ is 0 to 10 mol %, and wherein an ISO color contribution index (ISO/CCI) in terms of a flat plate with a thickness of 10 mm is 0 for blue (B), 9 or less for green (G), and 9 or less for red (R).

19. The optical glass according to claim 18, wherein a total content of $TiO_2$, $Nb_2O_5$, $WO_3$ and $Bi_2O_3$ is 37 mol % or more.

20. The optical glass according to claim 18, wherein a total content of $TiO_2$, $Nb_2O_5$, $WO_3$ and $Bi_2O_3$ is 38 mol % or more.

21. The optical glass according to claim 18, wherein a total content of $TiO_2$, $Nb_2O_5$, $WO_3$ and $Bi_2O_3$ is 39 mol % or more.

22. The optical glass according to claim 18, wherein a total content of $TiO_2$, $Nb_2O_5$, $WO_3$ and $Bi_2O_3$ is 40 mol % or more.

23. The optical glass according to claim 18, wherein a content of noble metal is 3.0 ppm or less.

24. The optical glass according to claim 18, wherein the value of βOH shown in below equation (7) is 0.1 $mm^{-1}$ or more, $$\beta OH = -[\ln(B/A)]/t \qquad (7)$$

wherein t represents a thickness (mm) of the glass used to measure the external transmittance, A represents an external transmittance (%) in the wavelength of 2500 nm when light is incident on the glass to be parallel to a thickness direction thereof, and B represents an external transmittance (%) in the wavelength of 2900 nm when light is incident on the glass to be parallel to the thickness direction thereof, and ln is a natural logarithm.

25. The optical glass according to claim 18, wherein the refractive index (nd) is 1.92 or more.

26. The optical glass according to claim 18, wherein the ISO color contribution index (ISO/CCI) in terms of a flat plate with a thickness of 10 mm is 8.8 or less for green (G).

27. The optical glass according to claim 18, wherein the ISO color contribution index (ISO/CCI) in terms of a flat plate with a thickness of 10 mm is 8.8 or less for red (R).

28. An optical element comprising an optical glass set forth in claim 18.

29. An imaging lens having a barrel and a plurality of single lenses arranged in the barrel, wherein at least one of the plurality of single lenses comprises an optical glass set forth in claim 18.

* * * * *